(12) United States Patent
Hastings et al.

(10) Patent No.: US 10,920,614 B1
(45) Date of Patent: Feb. 16, 2021

(54) SYSTEMS FOR A WATER-COOLED CENTER HOUSING FOR A TURBOCHARGER

(71) Applicant: TURBONETICS HOLDINGS, INC., Moorpark, CA (US)

(72) Inventors: Michal Hastings, Moorpark, CA (US); Brian G. Regnier, Redondo Beach, CA (US)

(73) Assignee: TURBONETICS HOLDINGS, INC., Moorpark, CA (US)

(*) Notice: Subject to any disclaimer, the term of this patent is extended or adjusted under 35 U.S.C. 154(b) by 0 days.

(21) Appl. No.: 16/673,841

(22) Filed: Nov. 4, 2019

(51) Int. Cl.
| F02B 37/00 | (2006.01) |
| F01D 25/12 | (2006.01) |
| F01D 25/14 | (2006.01) |
| F02B 37/013 | (2006.01) |
| F16K 5/08 | (2006.01) |
| F01P 7/14 | (2006.01) |

(52) U.S. Cl.
CPC .............. *F01D 25/14* (2013.01); *F01P 7/14* (2013.01); *F02B 37/013* (2013.01); *F16K 5/08* (2013.01); *F01P 2007/146* (2013.01); *F01P 2060/12* (2013.01)

(58) Field of Classification Search
CPC ...... F01P 2060/02; F01P 2060/12; F01P 3/00; F01D 25/12
See application file for complete search history.

(56) References Cited

U.S. PATENT DOCUMENTS

| 2005/0210875 A1* | 9/2005 | Larue ................... F16C 17/024 60/602 |
| 2012/0003081 A1* | 1/2012 | Woollenweber .......... F02C 6/12 415/180 |
| 2012/0263589 A1* | 10/2012 | Iwata ..................... F16C 17/18 415/229 |
| 2013/0323020 A1* | 12/2013 | Bogner .................. F02B 37/18 415/116 |
| 2016/0177814 A1* | 6/2016 | McHenry ............... F01N 13/14 415/1 |
| 2018/0163620 A1* | 6/2018 | Eriksson .................. F01P 3/20 |

* cited by examiner

*Primary Examiner* — Long T Tran
(74) *Attorney, Agent, or Firm* — McCoy Russell LLP

(57) ABSTRACT

Various systems are provided for a turbocharger center housing. In one example, a center housing for a turbocharger includes an internal water jacket including at least two ports, and a selectively pluggable interconnect positioned within the internal water jacket that, when plugged, blocks flow in the internal water jacket between the at least two ports in a first direction and, when unplugged, enables flow in the internal water jacket between the at least two ports in the first direction. In this way, flow may be directed through the center housing via different flow path configurations.

20 Claims, 11 Drawing Sheets

SYSTEMS FOR A WATER-COOLED CENTER HOUSING FOR A TURBOCHARGER

BACKGROUND

Technical Field

Embodiments of the subject matter disclosed herein relate to a water-cooled center housing for a turbocharger.

Discussion of Art

Engine systems, such as those included in a vehicle (e.g., a motor vehicle), may include a turbocharger to increase a pressure (e.g., boost) of air provided to an intake of an engine. The turbocharger may include a compressor driven by a turbine, the turbine arranged in an exhaust passage of the engine and the compressor arranged in an intake passage of the engine. Thus, combusted exhaust gases may drive rotation of the turbine which, in turn, drives rotation of the compressor, thereby providing power to boost the incoming intake air. The turbine and the compressor are driveably connected via a drive shaft encased in a center housing. The center housing may further house one or more bearings, such as a journal bearing, a thrust bearing, and/or a ball bearing.

During turbocharger operation, hot exhaust gases may increase a temperature of the turbine. Further, a temperature of the center housing and/or the bearing may increase due to proximity to the turbine. Exposure to high temperatures may degrade turbocharger components, such as the bearing(s), and/or lead to oil coking around the drive shaft. Therefore, the center housing may include a cooling system for mitigating heat transfer from the turbine to the bearing(s) or the compressor. In some examples, one or more water jackets may be incorporated into the center housing to decrease temperatures near the turbocharger bearing(s). Water and/or antifreeze (e.g., referred to herein as "cooling fluid" or "coolant") may flow into and out of the water jacket(s) through one or more ports, providing a supply of cooling fluid during operation. Such center housings may be referred to as "water-cooled" center housings. In some examples, the cooling fluid may be provided by an engine cooling system, such that cooling fluid may be cooled in a radiator and pumped to the turbocharger by one or more pumps. In other examples, the engine system may include a separate reservoir of turbocharger cooling fluid and may further include one or more additional pumps to direct cooling fluid through the turbocharger water jacket(s).

Current turbocharger center housings may include two ports located opposite each other across a width of the center housing, with a first port functioning as an inlet port for the cooling fluid to flow into the water jacket and a second port functioning as an outlet port for the cooling fluid to flow out of the water jacket. Thus, water lines connecting the turbocharger center housing to the cooling system may be positioned on opposite sides of the center housing, which may constrain installation of the turbocharger. Because engine system packaging space may be limited, the rigid configuration of the water lines may restrict turbocharger placement and/or prevent turbocharger installation if the water line configuration cannot be accommodated. For example, the turbocharger may only be installed in a position such that water lines may be routed to each side of the center housing without interfering with engine operation. As a result, users may be constrained to installing the turbocharger in a suboptimal location, become frustrated during turbocharger installation, or forgo turbocharger installation all together.

BRIEF DESCRIPTION

In one embodiment, a center housing for a turbocharger a center housing for a turbocharger includes an internal water jacket including at least two ports, and a selectively pluggable interconnect positioned within the internal water jacket that, when plugged, blocks flow in the internal water jacket between the at least two ports in a first direction and, when unplugged, enables flow in the internal water jacket between the at least two ports in the first direction.

DETAILED DESCRIPTION

The following description relates to embodiments of a center housing of a turbocharger. As one example, the turbocharger may include a turbine casing that houses a turbine wheel, a compressor casing that houses a compressor wheel, and a center housing surrounding a shaft connecting the turbine wheel and the compressor wheel and one or more bearings. The center housing may include a water jacket and an oil jacket. Further, the center housing may include multiple water jacket ports, including two water jacket ports on a first side of the housing (e.g., on a first radial edge of the center housing) and two on a second side of the housing (e.g., a second radial edge of the center housing that is opposite the first radial edge) that is opposite of the first side. Because of the multiple water jacket ports, a cooling system of an engine may be coupled to the center housing in a variety of configurations by using plugs to seal water jacket ports that are not in use. In one example, the center housing may be coupled to the cooling system such that cooling fluid from the cooling system enters the water jacket on one side of the housing (e.g., on the first radial edge of the center housing), and leaves the water jacket on the opposite side of the housing (e.g., on the second radial edge of the center housing). In another example, the center housing may be installed such that the cooling fluid enters the water jacket on one side of the housing and leaves the water jacket on the same side of the housing.

In this way, the center housing may be installed in multiple configurations, which may increase user flexibility during installation. For example, the user may select one of multiple configurations during installation, which may allow the turbocharger to be more easily installed in the available engine packaging space. Further, the center housing may simplify additional engine modifications. For example, a user may change the center housing configuration (e.g., by changing the location of one or more plugs and water lines to change a flow path) while installing other engine components that may interfere with the current center housing configuration. Because the center housing configuration may be altered by rearranging a plug/water line configuration, such alteration may be performed without removing the turbocharger or center housing from the engine system.

Figure 1:
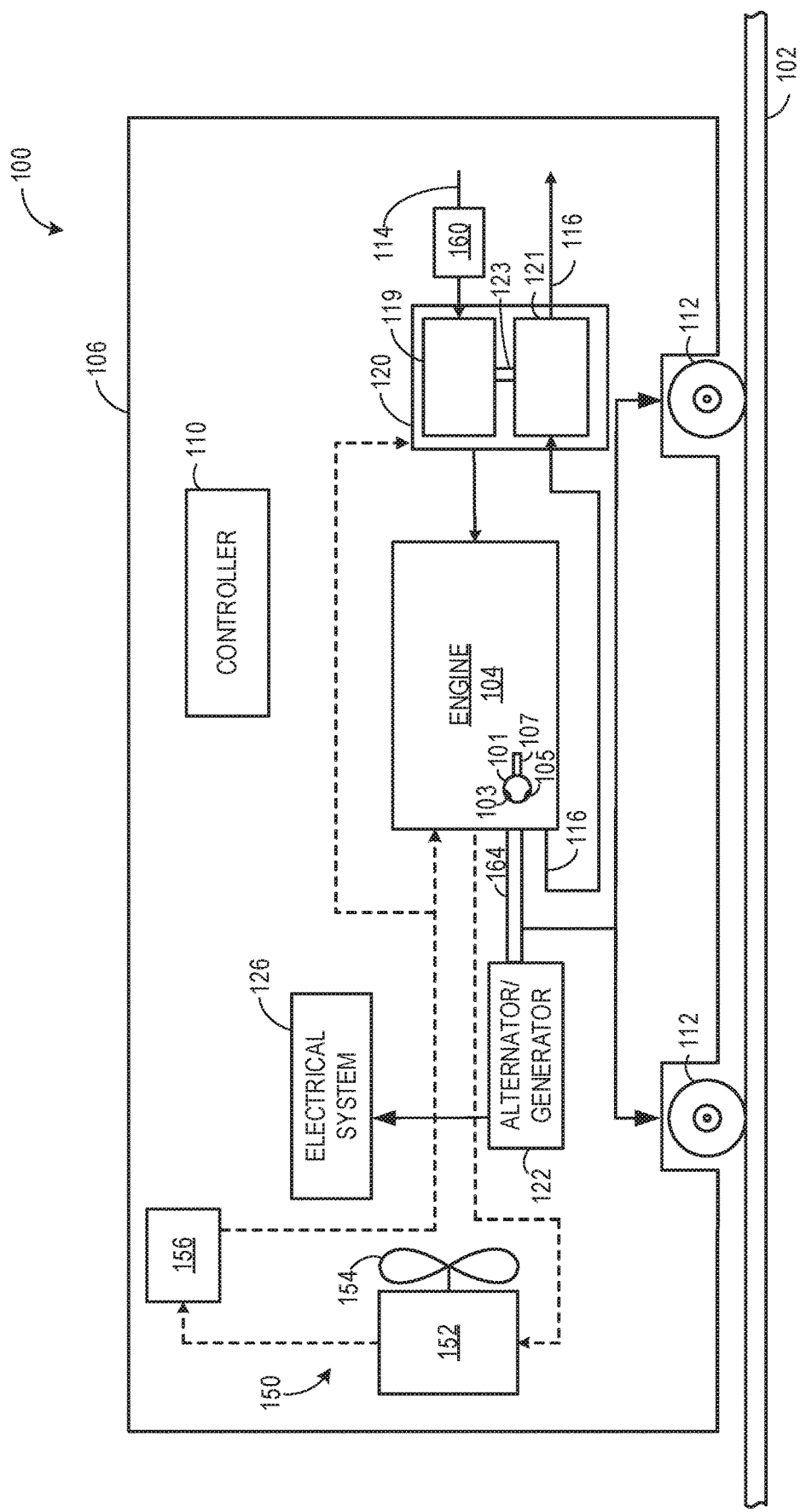
FIG. 1 shows a schematic diagram of a vehicle with an engine comprising a turbocharger arrangement, according to an embodiment of the present disclosure.
Figure 2:
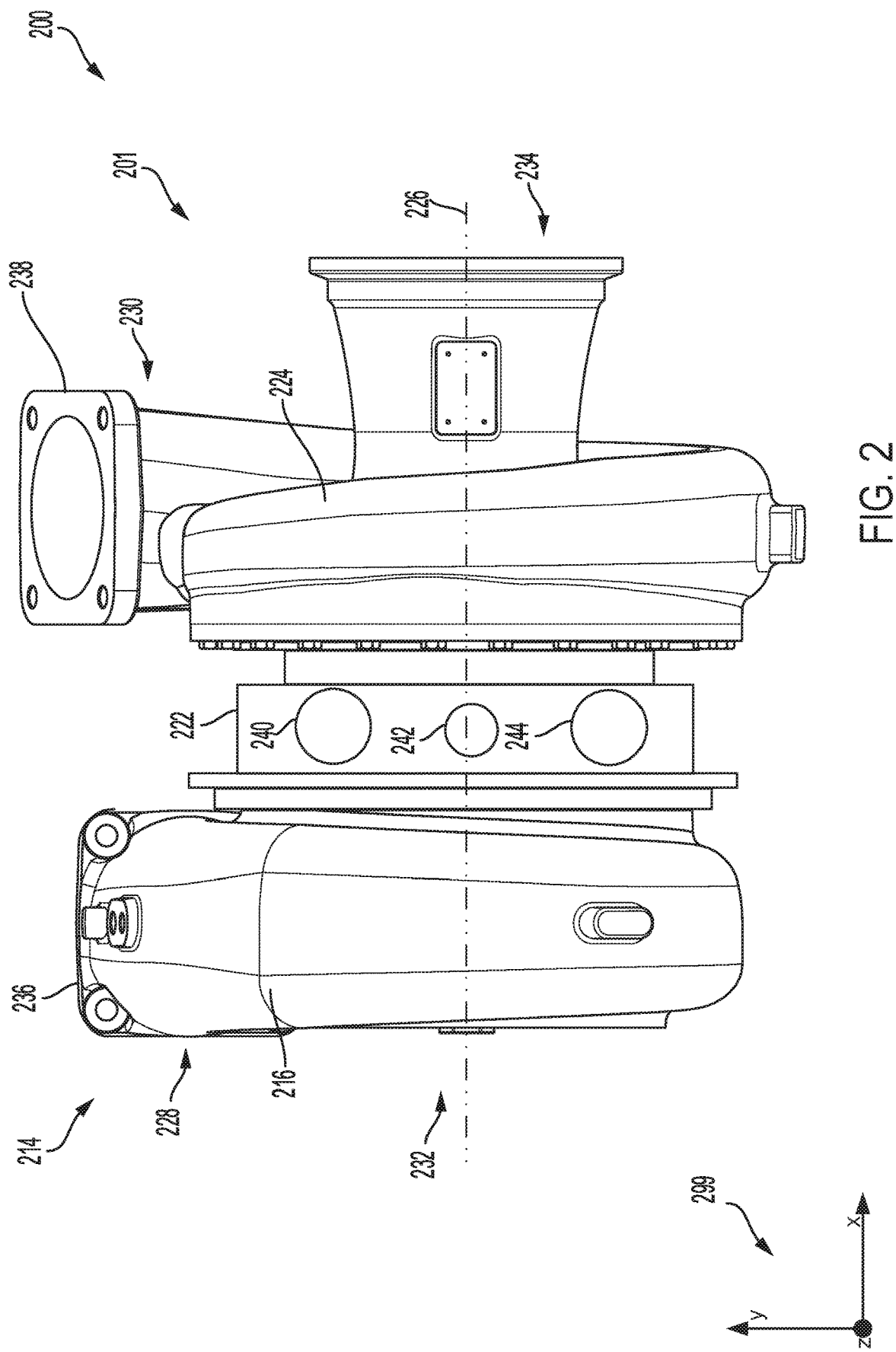
FIG. 2 shows an external view of an example turbocharger arrangement including a water-cooled center housing.
Figure 3:
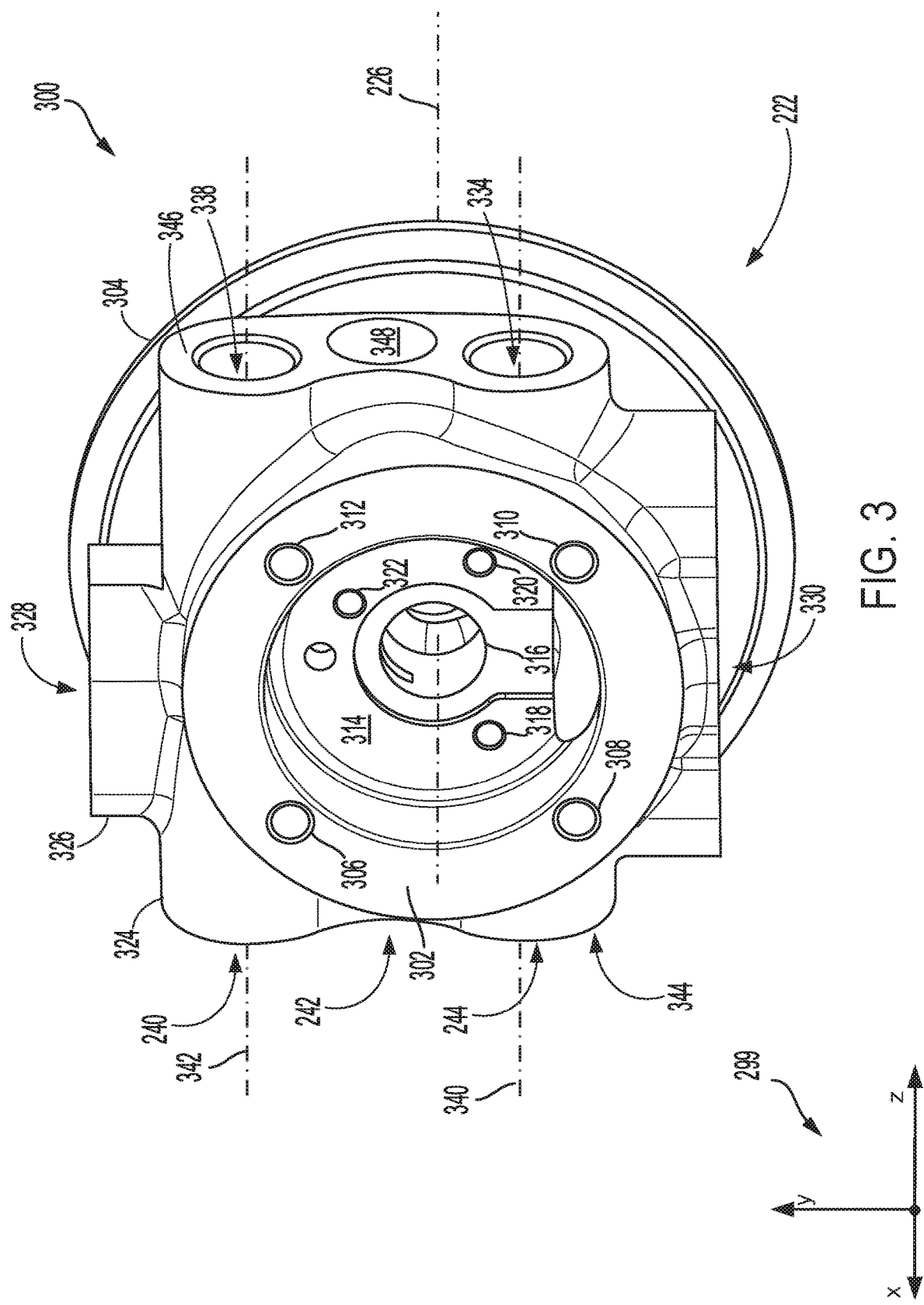
FIG. 3 shows an external view of the water-cooled center housing of FIG. 2.
Figure 4:
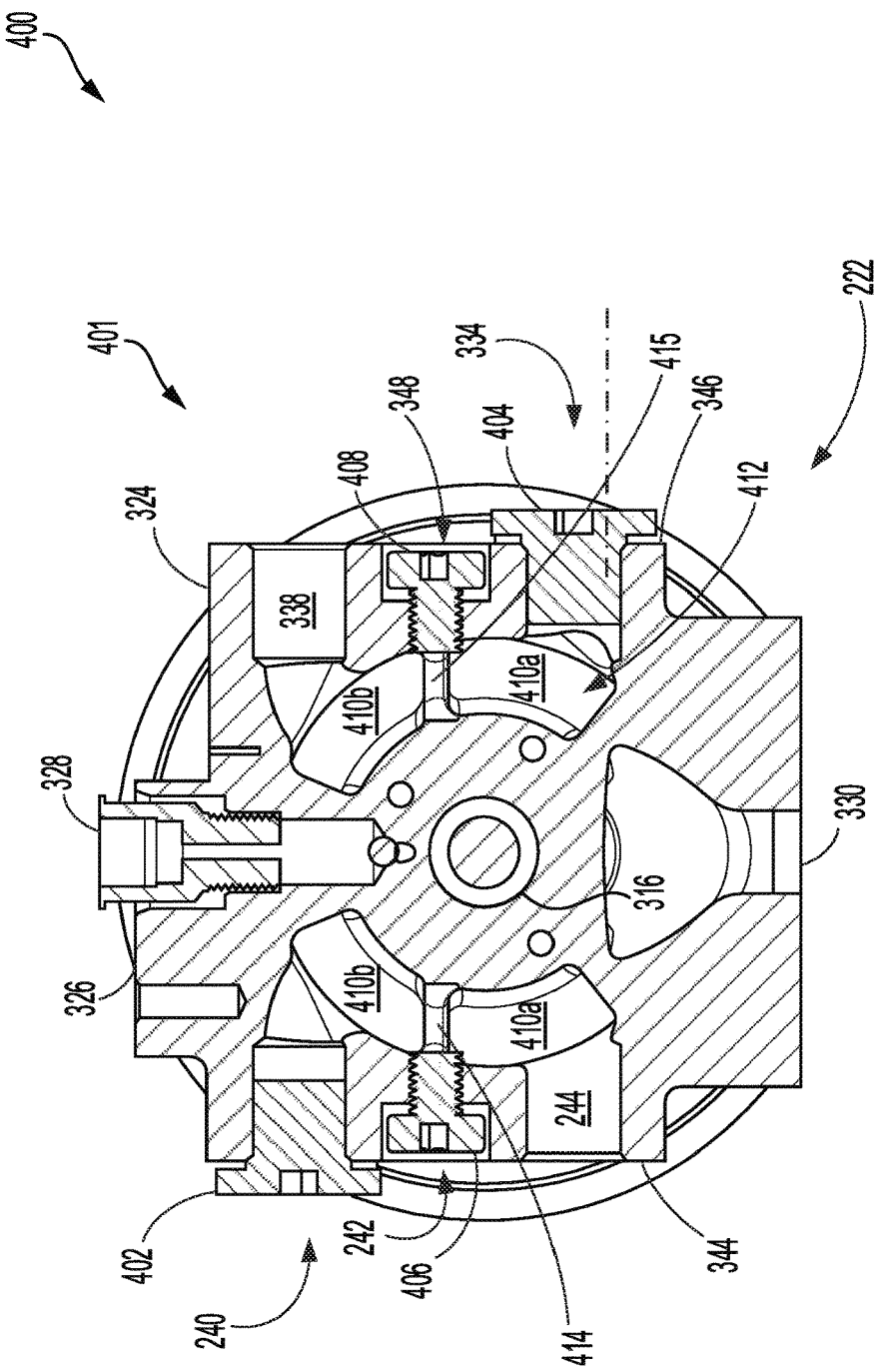
FIG. 4 shows a cross-sectional view of a first configuration of a center housing assembly.
Figure 5:
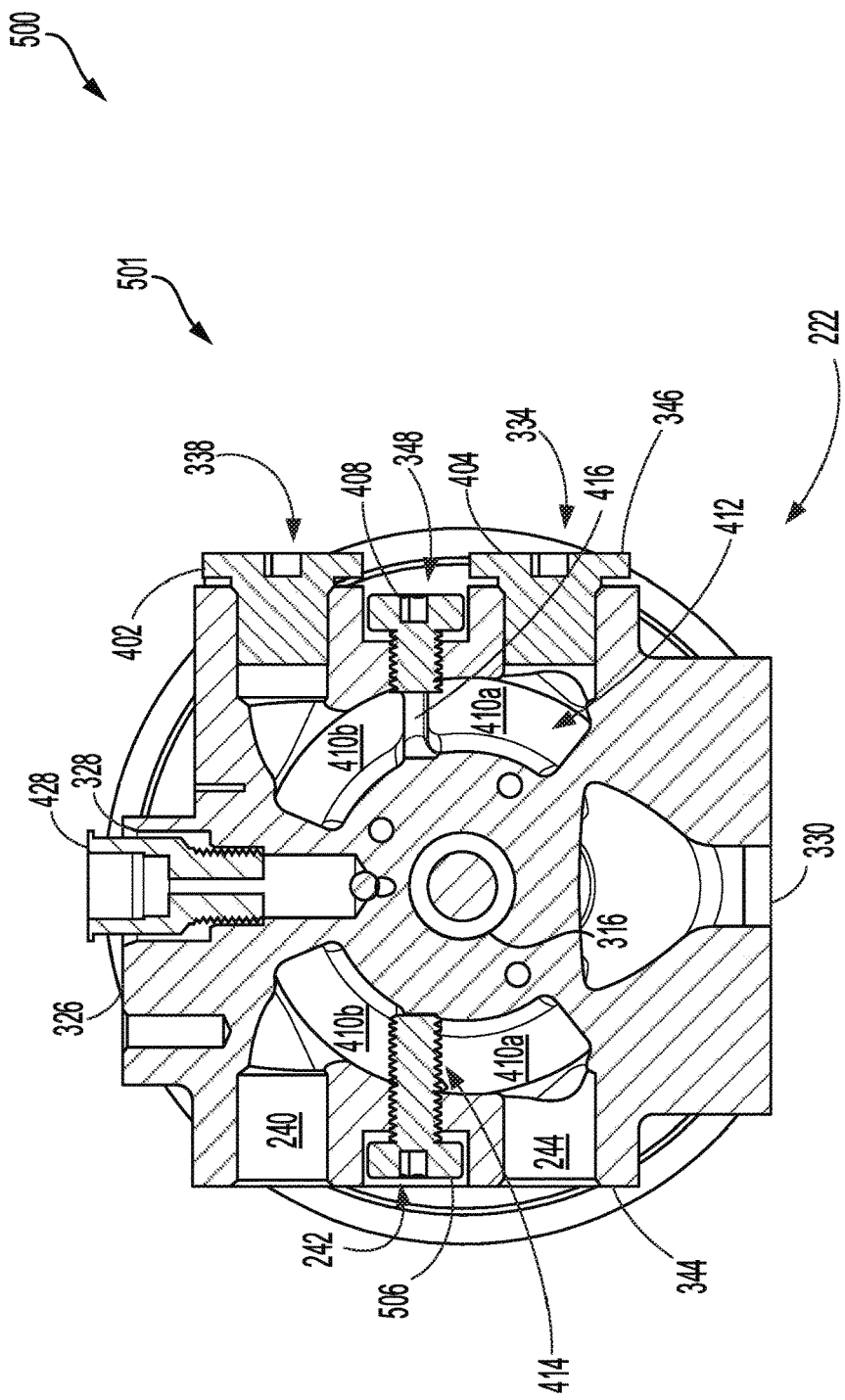
FIG. 5 shows a cross-sectional view of a second configuration of a center housing assembly.
Figure 5:
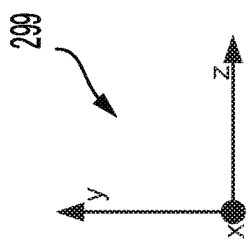

FIG. 1 shows an example of a vehicle engine system that includes a turbocharger for providing compressed air to the engine, the turbocharger and the engine both cooled by an engine cooling system. The turbocharger may include a water-cooled center housing coupled between a turbine of the turbocharger and a compressor of the turbocharger, as shown in FIG. 2, and may be adapted between a plurality of cooling fluid configurations. A perspective view of the water-cooled center housing is shown in FIG. 3. The water-cooled center housing includes a plurality of plugs, which may be arranged to select between distinct flow path configurations through the water jacket. A first flow path configuration is shown in FIG. 4, where coolant enters the water jacket on one side of the housing and leaves the water jacket on the opposite side of the housing. A second flow path configuration is shown in FIG. 5, where coolant enters the water jacket on one side of the housing and leaves the water jacket on the same side of the housing. Four example configurations of the center housing coupled to the engine cooling system are shown in FIGS. 6-9. FIG. 10 shows a turbocharger line (e.g., a line of turbochargers) including four turbochargers, each having a distinct center housing configuration. Additionally, an example method for flowing coolant through the water-cooled turbocharger center housing during engine operation is provided in FIG. 11.

The approach described herein may be employed in a variety of engine types and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, an automobile is provided as an example of a mobile platform supporting a system incorporating an embodiment of the invention.

Referring to FIG. 1, an embodiment of a system in which a turbocharger arrangement may be installed is shown. Specifically, FIG. 1 shows a block diagram of an embodiment of a vehicle system 100, herein depicted as a motor vehicle 106 (e.g., automobile), configured to run on a road 102 via a plurality of wheels 112. As depicted, the motor vehicle 106 includes an engine 104. The engine includes a plurality of cylinders 101 (only one representative cylinder shown in FIG. 1) that each include at least one intake valve 103, at least one exhaust valve 105, and at least one fuel injector 107. Each intake valve, exhaust valve, and fuel injector may include an actuator that may be actuated via a signal from a controller 110 of the engine 104. In other non-limiting embodiments, the engine 104 may be a stationary engine, such as in a power-plant application, or an engine in a marine vessel or other off-highway vehicle propulsion system as noted above.

The engine 104 receives intake air for combustion from an intake passage 114. The intake passage 114 includes an air filter 160 that filters air from outside of the motor vehicle. Exhaust gas resulting from combustion in the engine is supplied to an exhaust passage 116. Exhaust gas flows through the exhaust passage 116 and out of an exhaust system of the motor vehicle. Combustion in the cylinder drives rotation of a crankshaft 164. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally or alternatively combust fuel including gasoline, kerosene, natural gas, biodiesel, or other petroleum distillates of similar density through compression ignition and/or spark ignition.

As depicted in FIG. 1, the engine is coupled to an electric power generation system that includes an alternator/generator 122. For example, the engine is a diesel and/or natural gas engine that generates a torque output that is transmitted to the alternator/generator 122, which is mechanically coupled to the crankshaft 164, as well as to at least one of the plurality of wheels 112 to provide motive power to propel the motor vehicle. The alternator/generator 122 produces electrical power that may be stored and applied for subsequent propagation to a variety of downstream electrical components. In one example, the alternator/generator 122 may be coupled to an electrical system 126. The electrical system 126 may include one or more electrical loads configured to run on electricity generated by the alternator/generator 122, such as vehicle headlights, a cabin ventilation system, and an entertainment system, and may further include an energy storage device (e.g., a battery) configured to be charged by electricity generated by the alternator/generator 122. In some examples, the vehicle may be a diesel electric vehicle, and the alternator/generator 122 may provide electricity to one or more electric motors to drive the wheels 112.

The vehicle system may include a turbocharger 120 that is arranged between the intake passage and the exhaust passage. The turbocharger 120 increases an air charge of ambient air drawn into the intake passage in order to provide greater charge density during combustion to increase power output and/or engine operating efficiency. The turbocharger 120 may include at least one compressor 119, which is at least partially driven by at least one corresponding turbine 121 via a turbocharger shaft 123.

In some embodiments, the vehicle system may further include an aftertreatment system coupled in the exhaust passage upstream and/or downstream of the turbocharger 120. In one embodiment, the aftertreatment system may include one or more emission control devices. Such emission control devices may include a selective catalytic reduction (SCR) catalyst, a three-way catalyst, a $NO_x$ trap, or various other devices or exhaust aftertreatment systems. In another embodiment, the aftertreatment system may additionally or alternatively include a diesel oxidation catalyst (DOC) and a diesel particulate filter (DPF).

As depicted in FIG. 1, the vehicle system further includes a cooling system 150 (e.g., an engine cooling system). The cooling system 150 circulates coolant through the engine 104 to absorb waste engine heat and distribute the heated coolant to a heat exchanger, such as a radiator 152 (e.g., a radiator heat exchanger). In one example, the coolant may be water or antifreeze. In another example, the coolant may be a mixture of water and antifreeze. A fan 154 may be coupled to the radiator 152 in order to maintain an airflow through the radiator 152 when the vehicle is moving slowly or stopped while the engine 104 is running. In some examples, fan speed may be controlled by the controller 110. Coolant that is cooled by the radiator 152 may enter a tank (not shown). The coolant may then be pumped by a water, or coolant, pump 156 back to the engine or to another component of the vehicle system. Coolant may be pumped via a series of water lines, such that one or more water lines fluidically couples the radiator to the pump, one or more water lines fluidically couples the pump to the engine, and one or more water lines fluidically couples the engine 104 to the radiator. In some examples, the water lines may be fabricated from a flexible material, such as polyurethane or rubber, for example. In other examples, the water lines may be fabricated from an inflexible material, such as copper or steel. As depicted in FIG. 1, the coolant is also pumped to the turbocharger 120. Thus, the turbocharger may be fluidically coupled to the cooling system 150 of the vehicle system 100. As an example, coolant may be pumped into the water jacket of the turbocharger center housing via a series of water lines, as described with respect to FIGS. 6-9 in more detail, and back to the radiator 152.

The controller 110 may be configured to control various components related to the motor vehicle. As an example, various components of the vehicle system may be coupled to the controller 110 via a communication channel or data bus. In one example, the controller 110 includes a computer control system. The controller 110 may additionally or alternatively include a memory holding non-transitory computer readable storage media (not shown) including code for enabling on-board monitoring and control of motor vehicle operation. In some examples, the controller 110 may include more than one controller each in communication with one another, such as a first controller to control the engine and a second controller to control other operating parameters of the vehicle (such as engine load, engine speed, brake torque, etc.). The first controller may be configured to control various actuators based on output received from the second controller and/or the second controller may be configured to control various actuators based on output received from the first controller.

The controller 110 may receive information from a plurality of sensors and may send control signals to a plurality of actuators. The controller 110, while overseeing control and management of the engine and/or vehicle, may be configured to receive signals from a variety of engine sensors, as further elaborated herein, in order to determine operating parameters and operating conditions, and correspondingly adjust various engine actuators to control operation of the engine and/or vehicle. For example, the controller 110 may receive signals from various engine sensors including, but not limited to, measurements of engine speed, engine load, intake manifold air pressure, boost pressure, exhaust pressure, ambient pressure, ambient temperature, exhaust temperature, particulate filter temperature, particulate filter back pressure, engine coolant pressure, or the like. Additional sensors, such as coolant temperature sensors, may be positioned in the cooling system. Correspondingly, the controller 110 may control the engine and/or the vehicle by sending commands to various components such as the alternator/generator 122, fuel injectors 107, valves, coolant pump 156, or the like. For example, the controller 110 may control the operation of a restrictive element (e.g., such as a valve) in the engine cooling system. Other actuators may be coupled to various locations in the vehicle.

FIGS. 2-5 provide embodiments of a water-cooled center housing for a turbocharger. FIGS. 2-5 will be described collectively, with like components numbered the same and not reintroduced between figures. FIGS. 2-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. Further, reference axes 299 are included in each of FIGS. 2-5 in order to compare the view and relative orientations described below. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2-5 are drawn approximately to scale, although other dimensions or relative dimensions may be used.

Turning now to FIG. 2, a view 200 of a turbocharger 201 is shown. The turbocharger 201 may be used as the turbocharger 120 in the system of FIG. 1, for example, coupled to an engine intake system and an engine exhaust system. The view 200 shown in FIG. 2 is in the x-y plane, as indicated by reference axes 299. The x-axis is parallel to a central axis 226 of the turbocharger 201. Central axis 226 also defines an axis of rotation of the turbocharger 201 and is coaxial with a shaft of the turbocharger (not shown). Further, each of the y- and the z-axes are perpendicular to the central axis 226. The turbocharger 201 includes a turbine casing 216 housing a turbine wheel, a compressor casing 224 housing a compressor wheel, and a center housing 222 surrounding a shaft and associated bearings connecting the turbine wheel to the compressor wheel and arranged between the turbine case and compressor case. A plurality of bolts may mutually couple the turbine case, the compressor case, the center housing, a compressor shroud, and/or a turbine shroud.

The center housing 222 is positioned between the turbine casing 216 and the compressor casing 224 without additional components positioned therebetween and may support the turbocharger shaft (not shown) and one or more bearings (not shown). Further, as shown in FIG. 2, the compressor casing 224 is directly coupled to the center housing 222 by a plurality of bolts (where directly coupled is defined as being directly coupled to a component without additional intervening components positioned therebetween), and the center housing 222 is directly coupled to the turbine casing 216 by a plurality of bolts. Together, the turbine casing 216, the center housing 222, and the compressor casing may form a turbocharger casing 214. In some examples, each of the turbine casing 216, the center housing 222, and the compressor casing 224 may be comprised of one or more individual components, which may be fastened together by bolts, welding, screws, adhesive, and/or other fasteners. In other examples, each of the turbine casing 216, the center housing 222, and the compressor casing 224 may be monolithic components with no joints or seams. In some examples, the turbine casing 216 and the compressor casing 224 may provide only an external housing for internal turbocharger components, while the center housing 222 may also include internal components (e.g., a water jacket), as will be elaborated below with respect to FIGS. 3-5.

Additionally, as shown in FIG. 2, the turbine casing 216 includes a turbine inlet 228. The turbine inlet 228 directs gas flow from a volute of the turbine casing 216 to the turbine wheel. The turbine casing 216 additionally includes a turbine outlet 232, which directs exhaust gas from the turbine wheel into the engine exhaust system. Further, the compressor casing 224 includes a compressor outlet 230. The compressor outlet 230 directs compressed air flow from a volute of the compressor casing 224 to the engine intake system. The compressor casing 224 additionally includes a compressor inlet 234, which directs ambient air from the engine intake system into the compressor wheel. The turbocharger casing 214 may further include a turbine mounting bracket 236 at the turbine inlet 228 and a compressor mounting bracket 238 at the compressor outlet 230.

The center housing 222 of the turbocharger 201 includes a water jacket and an oil jacket. The oil jacket may circulate engine oil in the center housing to provide lubrication for the turbocharger shaft and bearings, in one example. Further, the water jacket may route a cooling fluid, such as water or a mix of water and anti-freeze, from a cooling system (e.g., engine cooling system 150) into and out of an annular passage surrounding the bearing and shaft, providing active cooling of the bearing and shaft during turbocharger operation. The center housing 222 includes four water ports, including a first inlet water port 244 and a first outlet water port 240. The center housing assembly may also include two routing ports, including a first routing port 242. The water jacket, arranged within the center housing 222, surrounds a portion of the shaft that runs through the center housing (e.g., proximate to the turbine end of the turbocharger). In some embodiments, the water jacket may be the only cooling system component of the turbocharger 201. For example, the turbocharger casing 214 may not include any additional water jackets or additional air cooling other than the water jacket described herein. For example, the turbine casing 216 may not include any water-cooling or air-cooling, and thus, there may be a relatively large thermal gradient between the center housing 222 and the turbine casing 216.

Turning now to FIG. 3, a view 300 of the center housing 222 is shown. As indicated by reference axes 299, view 300 shows the center housing 222 rotated about the y-axis such that foreshortened projections of each of the x- and the z-axes are shown. The center housing 222 includes an annular compressor face 302, which may be coupled to the compressor casing 224 of FIG. 2, and a bearing flange 304, which may be coupled to turbine casing 216. The compressor face 302 may include a plurality of bolt holes, such as bolt holes 306, 308, 310, and 312, to enable coupling of the compressor face 302 to compressor casing 224 of FIG. 2 via bolts, for example. The center housing 222 also includes a bearing 314 and a shaft bore 316, which may house a turbocharger shaft (e.g., the turbocharger shaft 123 of FIG. 1). The shaft bore 316 may be centered around central axis 226. Further, the bearing 314 may be coupled to the center housing 222 via bolts through bearing bolt holes 318, 320, and 322. In the example shown in FIG. 3, the bearing 314 is a thrust bearing, although other bearing types may also be used (e.g., a roller bearing or a journal bearing). In some examples, one or more additional bearings may be included within center housing 222.

As mentioned above, the center housing 222 includes a water jacket 324 and an oil jacket 326, providing cooling and lubrication, respectively, to the shaft and bearings. Oil may enter the oil jacket 326 via an oil port 328 and may leave the oil jacket via an oil drain 330. For example, an oil pump may pump pressurized oil through the engine system, including the center housing 222, to provide lubrication to engine system components. The pressurized oil may be fed into the oil jacket 326 via the oil port 328 and may lubricate the turbocharger shaft and the thrust bearing 314 (among other bearings), such that the shaft and the bearings may rotate around central axis 226 with reduced friction, for example. Oil may drain out of the oil jacket through the oil drain 330 and may be recirculated through the engine oil system, as an example.

Further, cooling fluid (e.g., coolant) may enter the water jacket 324 via an inlet water port and leave the water jacket 324 via an outlet water port. The center housing includes two inlet water ports, first inlet water port 244 and a second inlet water port 334, and two outlet water ports, first outlet water port 240 and a second outlet water port 338. The first inlet water port 244 and the second inlet water port 334 may be positioned such that an axis 340 extends through a center line of the first inlet water port 244 and the second inlet water port 334. Thus, the first inlet water port 244 and the second inlet water port 334 may be aligned with respect to a y-direction position and an x-direction position, in some examples. Likewise, the first outlet water port 240 and the second outlet water port 338 may be positioned such that an axis 342 extends through a center line of the first outlet water port 240 and the second outlet water port 338, for example. Thus, the first outlet water port 240 and the second outlet water port 338 may be aligned with respect to a y-direction position and an x-direction position. The axis 340 may be parallel to and spaced apart from (e.g., in the negative y-direction) the axis 342. Further, each of axis 340 and axis 342 may be perpendicular to the turbocharger shaft. Further still, the first inlet water port 244 is positioned vertically below (with respect to the y-axis and respect to gravity) the first outlet water port 240. The first inlet water port 244 and the first outlet water port may be aligned with respect to an x-direction position and a z-direction position. Similarly, the second inlet water port 334 is positioned vertically below the second outlet water port 338 and may be aligned with the second outlet water port 338 with respect to an x-direction position and a z-direction position. For example, the first inlet water port 244, the second inlet water port 334, the first outlet water port 240, and the second outlet water port 338 may be aligned on a common y-z plane, with a shared x-direction position.

The first inlet water port 244 and the first outlet water port 240 are each positioned on a first side face 344 of the water jacket 324, which may be a planar surface parallel to the x-y plane, as indicated by reference axes 299. The second inlet water port 334 and the second outlet water port 338 are each positioned on a second side face 346 of the water jacket 324, which also may be a planar surface parallel to the x-y plane. Thus, the first side face 344 may be parallel to the second side face 346. Further, the first side face 344 may be displaced from central axis 226 by a distance along the z-axis, and the second side face 346 may be displaced from the central axis 226 by the same distance and in the opposite direction along the z-axis. Further, in some examples, each of the four water ports (e.g., the first inlet water port 244, the second inlet water port 334, the first outlet water port 240, and the second outlet water port 338) forms a cylindrical cavity within the center housing 222. For example, the cylindrical cavity of each port includes an external opening on the side face on which the port is positioned and an internal opening at an internal portion of the water jacket 324, as will be elaborated below with respect to FIG. 4. Further, the four water ports may have the same dimensions, including the same diameter and the same depth. In other embodiments, the water ports may be of different sizes. For example, the first inlet water port 244 and the second inlet water port 334 may share a first set of dimensions, and the first outlet water port 240 and the second outlet water port 338 may share a second set of dimensions, which is different than the first set.

The center housing 222 further includes a routing port 348, positioned on the second side face 346, and routing port 242, positioned on the first side face 344. Each of the two routing ports (e.g., routing port 242 and routing port 348) forms a cylindrical cavity in the center housing 222. Similar to the inlet ports and the outlet ports, the routing port 348 and the routing port 242 share a common y-direction position and a common x-direction position while being displaced from each other along the z-direction. The shape and positioning of the routing port 348 and the routing port 242 will be further described below with respect to FIG. 4.

Although the center housing 222 includes two inlet water ports 244 and 334 and two outlet water ports 240 and 338, during use, only one of the two inlet water ports and only one of the two outlet water ports may be used. Therefore, water port plugs and routing plugs may be used to cover unused water ports and achieve a desired flow path through the water jacket 324. Turning now to FIG. 4, a cross-sectional view 400 of the center housing 222 included in a first example center housing assembly 401 is shown. View 400 is a planar view in the z-y plane, as indicated by reference axes 299. The center housing assembly 401 includes the center housing 222 of FIGS. 2 and 3, a first water port plug 402, a second water port plug 404, a first short routing plug 406, and a second short routing plug 408. The center housing 222 further includes an oil coupling 428 positioned in the oil port 328 for delivering oil to the oil jacket 326.

As illustrated in FIG. 4, the water jacket 324 includes an internal hollow annular passage 412 comprised of a first (e.g., bottom with respect to the page and with respect to gravity) passage portion 410a and a second (e.g., top with respect to the page and with respect to gravity) passage portion 410b. For example, the annular passage 412 may be manufactured from a two-piece core, where a first piece forms the first passage portion 410a and a second, separate piece forms the second passage portion 410b. A first interconnect 414 and a second interconnect 415 are positioned between the first passage portion 410a and the second passage portion 410b and configured to selectively enable flow between the first passage portion 410a the second passage portion 410b depending on a shape (e.g., length) of a routing plug positioned therein, as elaborated below. As one example, the first interconnect 414 includes a drill hole that extends from the routing port 242, and the second interconnect 415 includes a drill hole that extends from the routing port 348. In some examples, each passage portion 410a and 410b may be semi-circular and may comprise approximately half of the annular passage 412. In other examples, each passage portion 410a and 410b may be arced portions, with one passage portion comprising more than half of the annular passage 412 and the other passage portion comprising less than half (e.g., the remainder) of the annular passage 412. Further, the first interconnect 414 and the second interconnect 415 may each form a constriction (e.g., a constrictive area) within the annular passage 412, with a cross-sectional area of the annular passage narrowing at each interconnect 414 and 415 without becoming completely blocked. For example, the first interconnect 414 and the second interconnect 415 may form divider walls between the first passage portion 410a and the second passage portion 410b while each of the first interconnect 414 and the second interconnect 415 includes a cavity that enables flow through the corresponding interconnect.

Each of the routing ports 242 and 348 may include cylindrical sections of differing diameters. As shown, an outer cylindrical section (e.g., closer to an external radial edge of the center housing 222) has a larger diameter than an inner cylindrical section (e.g., closer to the annular passage 412). Further, the inner cylindrical section includes a threaded inner surface that is adapted to engage with an externally threaded section of the routing plug (e.g., the first short routing plug 406 or the second short routing plug 408), whereas the outer cylindrical section is not threaded. However, in other examples, both of the outer cylindrical section and the inner cylindrical section may be threaded or not threaded. Further, the diameter of the outer cylindrical section is larger than a diameter of a head section of the routing plug, which has a larger diameter than the externally threaded section. In this way, when the routing plug is installed in the routing port, the head section of the routing plug may be positioned completely within the outer cylindrical section of the routing port. However, in other examples, each of the routing ports 242 and 348 may include a cylindrical cavity of a single diameter that may include a threaded or non-threaded inner surface. As one example, each routing port may include only the cylindrical cavity having the threaded inner surface. In such an example, the head section of the routing plug may not be positioned within the routing port and may extend outwardly from the corresponding side face 344 or 346. Further, the head section of each routing plug 406 and 408 may include a shape configured to engage with a tool, enabling the routing plug to be turned (or driven) to move it into or out of the routing port 242 or 348.

In the first example center housing assembly 401 shown in FIG. 4, the first short routing plug 406 is positioned in the routing port 242, partially extending into the first interconnect 414, and the second short routing plug 408 is positioned in the routing port 348, partially extending into the second interconnect 415. However, in other examples, the short routing plugs 406 and 408 may not extend into the interconnects 414 and 415. For example, the first short routing plug 406 may be flush with an outer perimeter of the annular passage 412 at the routing port 242, and the second routing plug 408 may be flush with the outer perimeter of the annular passage 412 at the routing port 348. The length of each of the short routing plugs 406 and 408 is such that the short routing plug does not extend entirely across the interconnects to reach an inner perimeter of the annular passage that is proximal to the shaft bore 316. Thus, the short routing plugs 406 and 408 do not fill the cavities of the first interconnect 414 and the second interconnect 415, and the first interconnect 414 and the second interconnect 415 remain unplugged while the short routing plugs 406 and 408 are installed.

The first interconnect 414 is configured to flow cooling fluid from the first passage portion 410a to the second passage portion 410b in a clockwise direction (with respect to the view 400) when the first short routing plug 406 is fitted in the routing port 242, while cooling fluid may not pass between the two passage portions when a long routing plug is fitted in the routing port 242, as will be described below with respect to FIG. 5. Likewise, the second interconnect 415 may be configured to flow cooling fluid from the first passage portion 410a to the second passage portion 410b in a counter-clockwise direction (with respect to the view 400) when the second short plug 408 is fitted in the routing port 348, while cooling fluid may not pass between the two passage portions when a long plug is fitted in the routing port 348. Thus, the first example center housing assembly 401 includes both the first interconnect 414 and the second interconnect 415 in an open, unplugged configuration. Further, the first short plug 406 seals the routing port 242, preventing the cooling fluid from flowing through the routing port 242. Similarly, the second short plug 408 seals the routing port 348, preventing cooling fluid from flowing through the routing port 348. Therefore, with the first short plug 406 and the second short plug 408, the first passage portion 410a and the second passage portion 410b are fluidically coupled at both the first interconnect 414 and the second interconnect 415 in the first example center housing assembly 401, enabling the cooling fluid to flow through the annular passage 412 in both clockwise and counterclockwise directions to contact a largest surface area of the center housing 222 (compared with flowing in only the clockwise or counterclockwise direction) for increased cooling effects.

In the first example center housing assembly 401 shown in FIG. 4, the first inlet water port 244 and the second outlet water port 338 are not fitted with water port plugs, while the first outlet water port 240 and the second inlet water port 334 are fitted with the first water port plug 402 and the second water port plug 404, respectively. Thus, the first inlet water port 244 and the second outlet water port 338 may be coupled to water lines, while the first outlet water port 240 and the second inlet water port 334 may not. Specifically, cooling fluid may be pumped into the first inlet water port 244 via an inlet water line, flow through the annular passage 412 (e.g., from the first passage portion 410a to the second passage portion 410b in via both the first interconnect 414, in the clockwise direction, and the second interconnect 415, in the counter-clockwise direction), and leave the water jacket to an exit water line via the second outlet water port 338, as will be elaborated below with respect to FIG. 6. Such a flow path configuration, wherein cooling fluid enters via a water port on one side face (e.g., the first side face 344 in this example) and leaves via a water port on the other side face (e.g., the second side face 346 in this example), may be referred to as a "through-flow" configuration.

The first water port plug 402 positioned within the first outlet water port 240 blocks flow into or out of the first outlet water port 240, and the second water port plug 404 positioned within the second inlet water port 334 prevents flow into or out of the second inlet water port 334. As such, the first water port plug 402 is sized such that the first outlet water port 240 is sealed, and the second water port plug 404 is sized such that the second inlet water port 334 is sealed. As noted in FIG. 3, each of the water ports may have the same diameter. Thus, the first water port plug 402 and the second water port plug 404 may be used interchangeably in any of the four water ports. In some embodiments, each of the first water port plug 402 and the second water port plug 404 may be threaded plugs fabricated from a metal (e.g., aluminum, steel, copper, etc.), wherein each plug may mate with an internally threaded wall of the water port. In another example, each of the water port plugs may be fabricated from rubber and/or plastic materials and may not be threaded. In the example shown in FIG. 4, each of the water port plugs 402 and 404 includes a smaller diameter portion and a larger diameter head portion. The smaller diameter portion of the water port plugs 402 and 404 may have an outer diameter that is smaller than an inner diameter of each water port but larger enough that, when inserted, the outer diameter of the water port plug is in face sharing contact with the inner diameter of the water port with no gaps or holes. In another example, the water port plugs 402 and 404 may be comprised of a deformable material. In such an example, the smaller diameter portion of the water port plugs 402 and 404 may be compressed when inserted into a water port and may expand to entirely fill the inner diameter of the water port. Further, in the example shown in FIG. the larger diameter head portion of each water port plug 402 and 404 remains on the exterior of the center housing 222 and includes a shape configured to engage with a tool, enabling the routing plug to be turned (or driven) to move it into or out of the water port 240 or 334. However, in other examples, the water port plugs 402 and 404 may not include a larger diameter head region and may instead be positioned entirely within the water port when installed, for example.

Because the water port plugs 402 and 404 may fit interchangeably within any of the first inlet water port 244, the second inlet water port 334, the first outlet water port 240, and the second outlet water port 338, there are four distinct center housing assembly configurations in which one of the two inlet water ports is plugged (e.g., with either the first water port plug 402 or the second water port plug 404) and the other is available for coupling to a water line and one of the two outlet water ports is plugged and the other is available for coupling to a water line, as will be elaborated below with respect to FIGS. 6-9. In this way, the center housing 222 may be configured for up to four distinct flow path configurations, each flow path configuration including an arrangement of plugs and a water line routing to the engine cooling system.

Turning now to FIG. 5, a cross-sectional view 500 of a second example center housing assembly, a second example center housing assembly 501, is shown. View 500 is a planar view in the z-y plane, as indicated by reference axes 299. The second example center housing assembly 501 is substantially identical to the first example center housing assembly 401 of FIG. 4 except for the differences described below. In the example configuration shown in FIG. 5, the first water port plug 402 is positioned in the second inlet water port 338 instead of the first inlet water port 240, as in FIG. 4, while the second water port plug 404 remains fitted within the second inlet water port 334. Thus, the first inlet water port 244 and the first outlet water port 240 are not fitted with water port plugs and may be coupled to water lines, which may supply a flow of cooling fluid. Specifically, cooling fluid may be pumped into the first inlet water port 244, may flow through the hollow annular passage 412, and may leave the water jacket via the first outlet water port 240, for example.

Unlike the first example center housing assembly 401, the second example housing assembly 501 includes a long routing plug 506 positioned in the routing port 242. The long routing plug 506 extends across an entire length of the first interconnect 414 to entirely fill the cavity of the first interconnect 414. As cooling fluid is pumped in to the water jacket, the cooling fluid flows into the first passage portion 410a from the first inlet water port 244. However, because the routing port 424 is fitted with the long plug 506, flow is blocked between the first passage portion 410a and the second passage portion 410b at the first interconnect 414. As a result, cooling fluid may not pass from the first passage portion 410a into the second passage portion 410b, and the cooling fluid may not pass from the second passage portion 410b into the first passage portion 410a. For example, the long routing plug 506 creates a seal between the first passage portion 410a and the second passage portion 410b at the first interconnect 414. However, because the routing port 348 is fitted with the short plug 408, the cooling fluid may flow between the first passage portion 410a and the second passage portion 410b at the second, open interconnect 415.

Thus, after entering the hollow annular passage 412, the cooling fluid may flow from the first passage portion 410a to the second passage portion 410b in the counterclockwise direction (with respect to the view 500). Such a flow path configuration, wherein cooling fluid enters via a water port on one side face (e.g., the first side face 344) and leaves via a water port on the same side face, may be referred to as "circular flow." Thus, in an installation including circular flow configuration, an inlet water line and the outlet water line are coupled to the same side face. In particular, by blocking (e.g., plugging) flow through the first interconnect 414, which is more proximal to the first inlet water port 244 and the first outlet water port 240 than the second interconnect 415, the cooling fluid is forced to take a longer path through the annular passage 412 thereby increasing a surface area of contact as well as a contact time between the center housing 222 and the cooling fluid for increased cooling effects.

Figure 6:
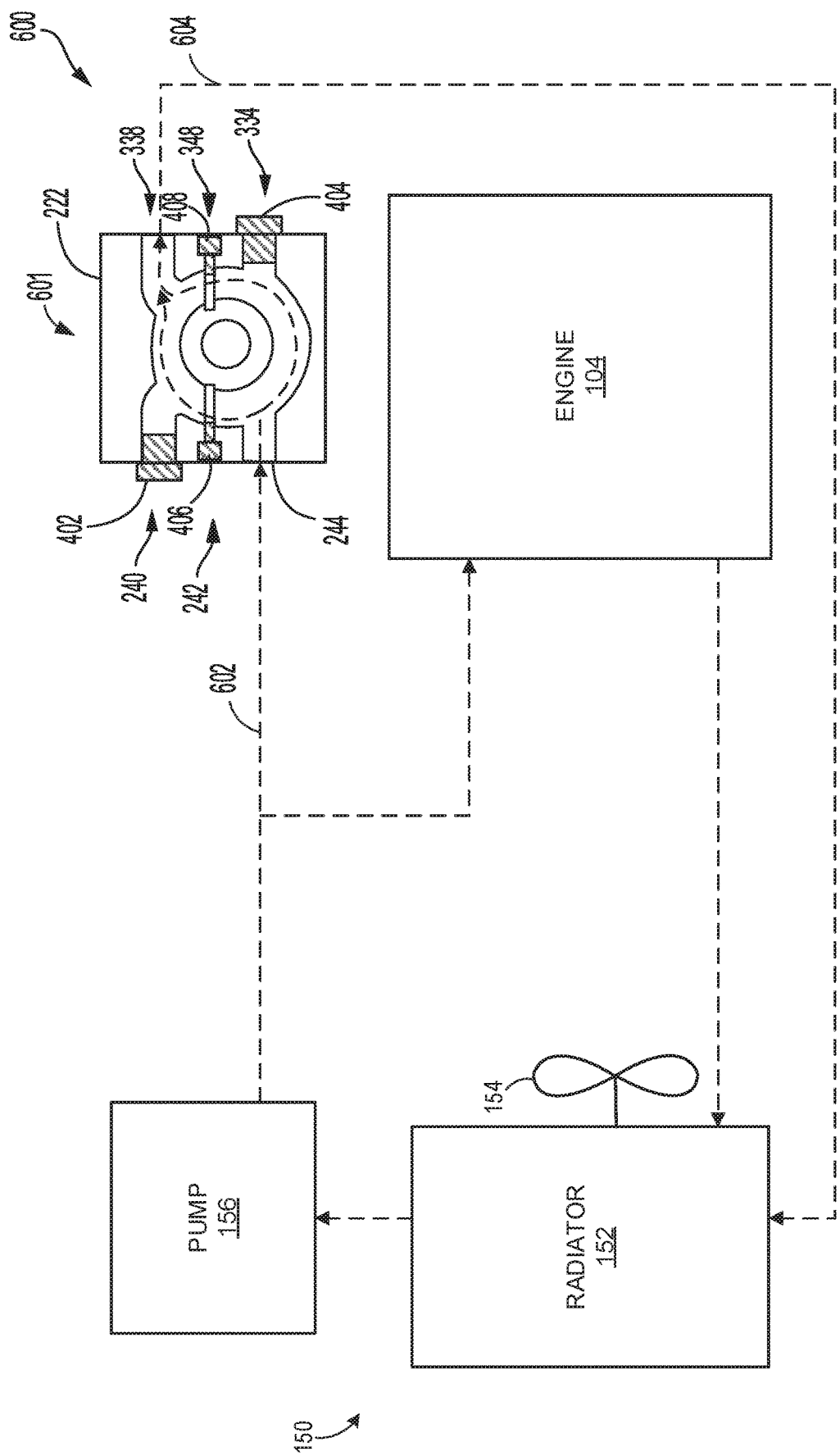
FIG. 6 shows a first example water line configuration for the center housing of FIG. 3.

Turning now to FIG. 6, a block diagram 600 of an embodiment of a cooling system of an engine, including a first center housing assembly configuration 601, is shown. Components of FIG. 6 previously introduced in FIGS. 1-5 are numbered the same and may not be reintroduced. Block diagram 600 includes engine cooling system 150, including the radiator 152, the fan 154, and the pump 165, which are coupled to the engine 104 via a series of water lines. For example, the cooling fluid may be delivered to the engine 104 by a first water line that fluidically couples the pump 156 to the engine 104, the cooling fluid may return to the radiator 152 by a second water line that fluidically couples the engine 104 to the radiator 152. The cooling fluid may be cooled at the radiator 152 before recirculation, for example.

Further, the cooling fluid may be pumped in and out of the water jacket of center housing 222 via an entry water line 602 and an exit water line 604 (represented in FIG. 6 by dashed lines), respectively. As elaborated in FIG. 4, the first center housing assembly configuration 601 may be referred to as having the "through flow" configuration, wherein the entry water line 602 is coupled to a water port integrated with one side face, and the exit water line 604 is coupled to a water port integrated with another side face. In the example embodiment shown in FIG. 6, the entry water line 602 is coupled to the first inlet water port 244, and the exit water line 604 is coupled to the second outlet water port 338. Thus, cooling fluid enters the water jacket of the center housing 222 via the entry water line 602 and the first inlet water port 244, and cooling fluid leaves the water jacket of the center housing 222 via the exit water line 604 and the second outlet water port 338. Further, the center housing assembly 601 is configured with short plugs 406 and 408 (e.g., plugs that allow flow through the water jacket unobstructed) in each of the routing ports 242 and 348, such that cooling fluid flows in the water jacket via the first inlet water port 244, through the water jacket in both radial directions (e.g., clockwise and counterclockwise) around the central axis 226 (shown in FIGS. 2 and 3) of the center housing 222, and out of the water jacket via the second outlet water port 338. Water port plugs 402 and 404 positioned within the first outlet water port 240 and the second inlet water port 334, respectively, prevent the cooling fluid from flowing out of the water jacket at either the first outlet water port 240 or the second inlet water port 334, as elaborated above with respect to FIG. 4. The cooling fluid may exit the center housing 222 via the second outlet water port 338 and the exit water line 604 and return to the radiator 152, where the cooling fluid may be cooled before recirculation, for example.

Figure 7:
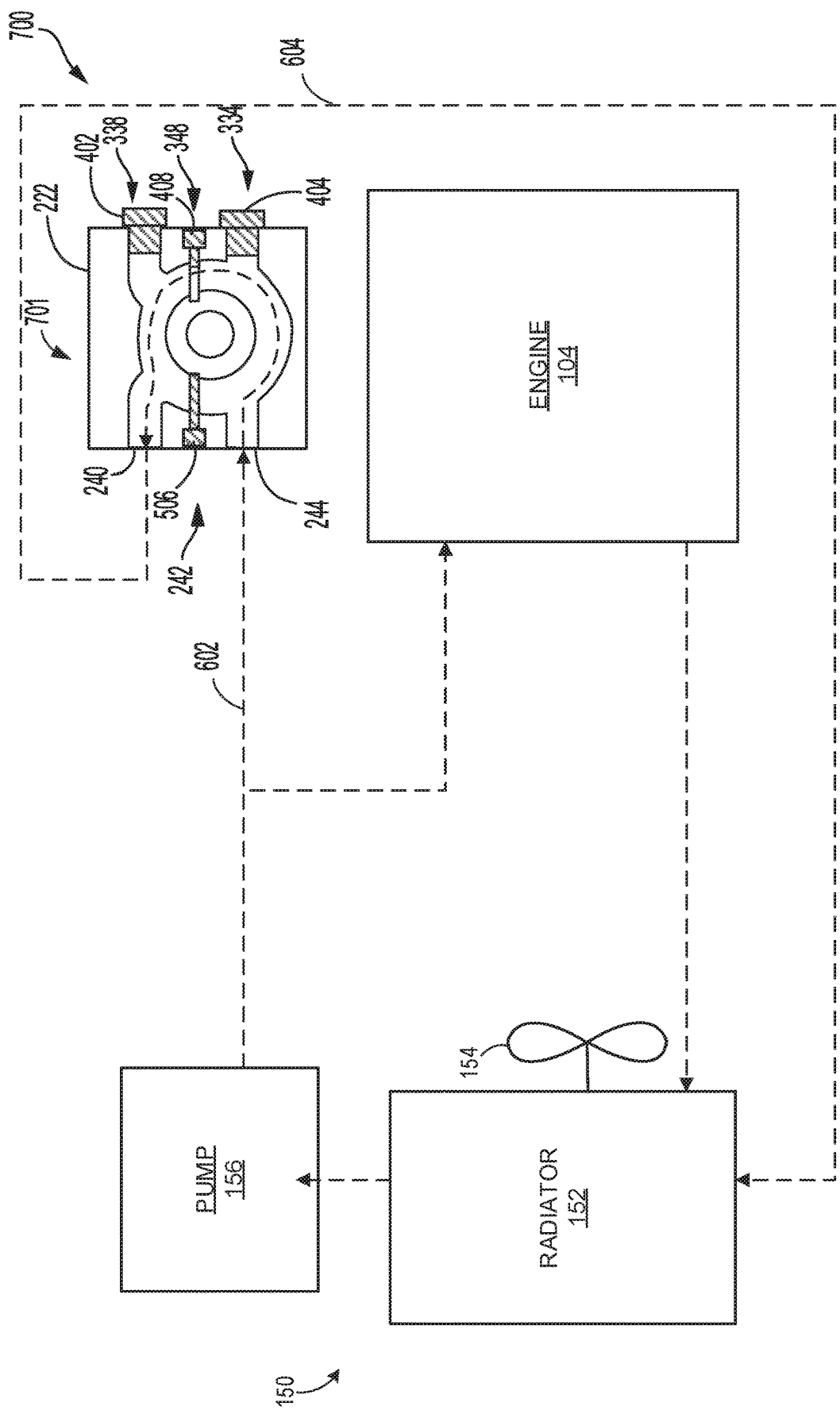
FIG. 7 shows a second example water line configuration for the center housing of FIG. 3.

Turning now to FIG. 7, a block diagram 700 of an embodiment of a cooling system of an engine, including a second center housing assembly configuration 701, is shown. Components of FIG. 7 previously introduced in FIGS. 1-6 are numbered the same and may not be reintroduced. The embodiment shown in block diagram 700 is identical to the cooling system of block diagram 600 with the exception of the second center housing assembly configuration 701, as will be elaborated below.

In the example shown in FIG. 7, the first inlet water port 244 is coupled to the entry water line 602, similar to the first center housing assembly configuration 601 of FIG. 6. However, unlike the first center housing assembly configuration 601, the second center housing assembly configuration 701 includes the exit water line 604 coupled to the first outlet water port 240. Further, the second center housing assembly configuration 701 includes a long plug 506 in routing port 242 (e.g., a plug that blocks flow through the water jacket) and a short plug 408 in routing port 348 (e.g., a plug that allows flow through the water jacket), such that cooling fluid flows from the entry water line 602 into the water jacket via the first inlet water port 244, through the water jacket in a counterclockwise (e.g., roughly circular) path around the central axis 226 shown in FIGS. 2 and 3, and out of the water jacket to the exit water line 604 via the first outlet water port 240. Water port plugs 402 and 404 seal the second outlet water port 338 and the second inlet water port 334, respectively.

Thus, the entry water line 602 fluidically couples the pump 156 to the first inlet water port 244, and the exit water line 604 fluidically couples the first outlet water port 240 to the radiator 152, with the first inlet water port 244 and the first outlet water port 240 positioned on the same side face of the water jacket. As elaborated in FIG. 5, this flow path configuration may be referred to as "circular flow," wherein the entry water line is coupled to a water port integrated with one side face, and the exit water line is coupled to a water port integrated with the same side face. The cooling fluid may exit the center housing 222 and return to the radiator 152 via the first outlet water port 240 and the exit water line 604, wherein the cooling fluid may be cooled before recirculation, for example.

Figure 8:
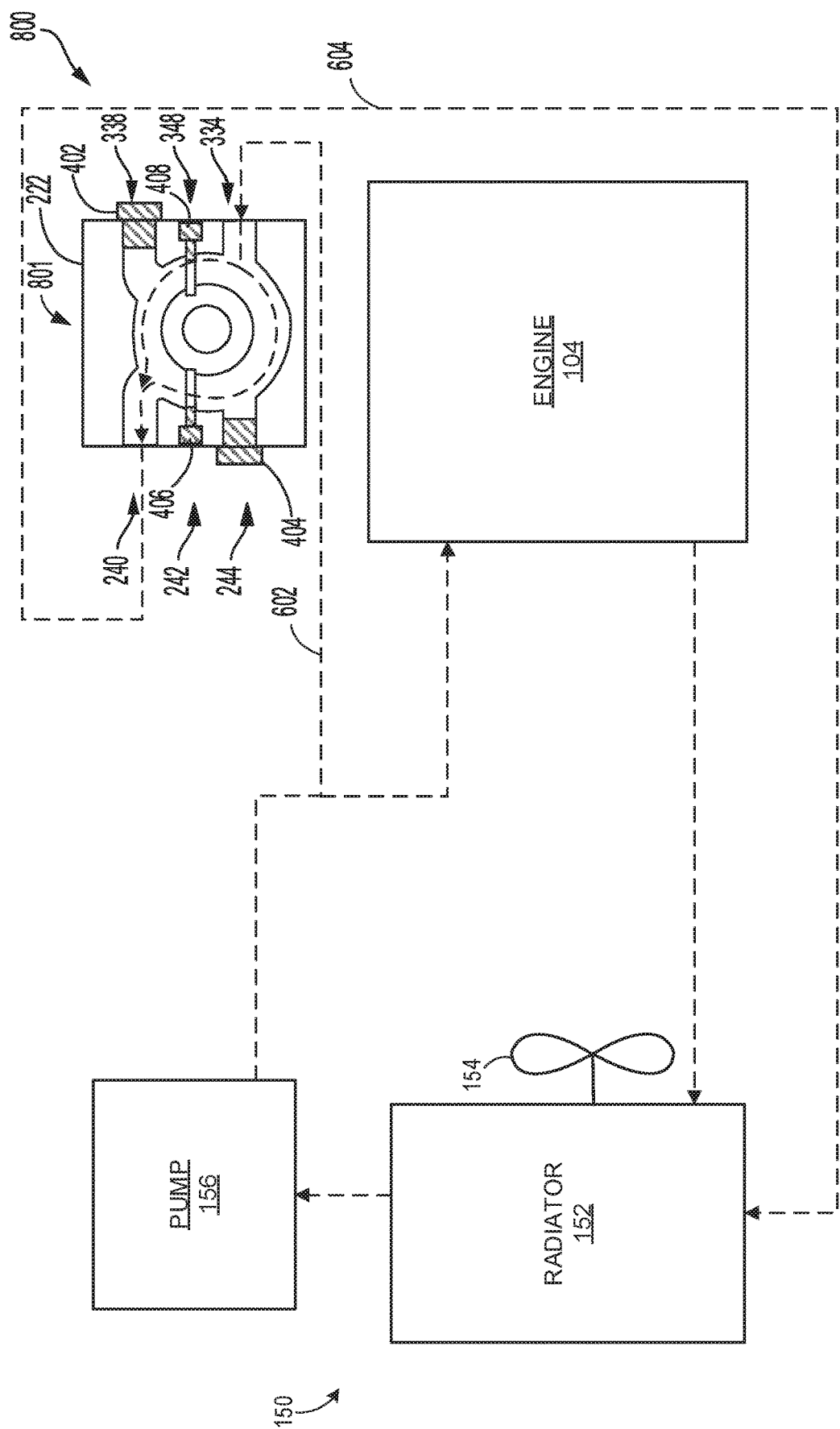
FIG. 8 shows a third example water line configuration for the center housing of FIG. 3.

Turning now to FIG. 8, a block diagram 800 of an embodiment of a cooling system of an engine including a third center housing assembly configuration 801 is shown. Components of FIG. 8 previously introduced in FIGS. 1-7 are numbered the same and may not be reintroduced. The embodiment shown in block diagram 800 is identical to the cooling systems of block diagrams 600 and 700 with the exception of the third center housing assembly configuration 801, as will be elaborated below.

Similar to the first center housing assembly configuration 601 of FIG. 6, the third center housing assembly configuration 801 includes the "through flow" flow path configuration. However, unlike the first center housing assembly configuration 601, the third center housing assembly configuration 801 includes the entry water line 602 coupled to the second inlet water port 334 and the exit water line 604 coupled to the first outlet water port 240. Further, the third center housing assembly configuration 801 includes the first water port plug 402 positioned in the second outlet water port 338 and the second water port plug 404 positioned in the first inlet water port 244. Thus, the entry water line 602 fluidically couples the pump 156 to the second inlet water port 334, and the exit water line 604 fluidically couples the first outlet water port 240 to the radiator 152. The cooling fluid flows from the entry water line 602 into the water jacket via the second inlet water port 334, through the water jacket in both radial directions (e.g., clockwise and counterclockwise) around the central axis 226 shown in FIGS. 2 and 3, and out of the water jacket to the exit water line 604 via the first outlet water port 240. Water port plugs may seal the first inlet water port 240 and the second outlet water port 338. The cooling fluid may exit the center housing 222 and return to the radiator 152, wherein the cooling fluid may be cooled before recirculation, for example.

Figure 9:
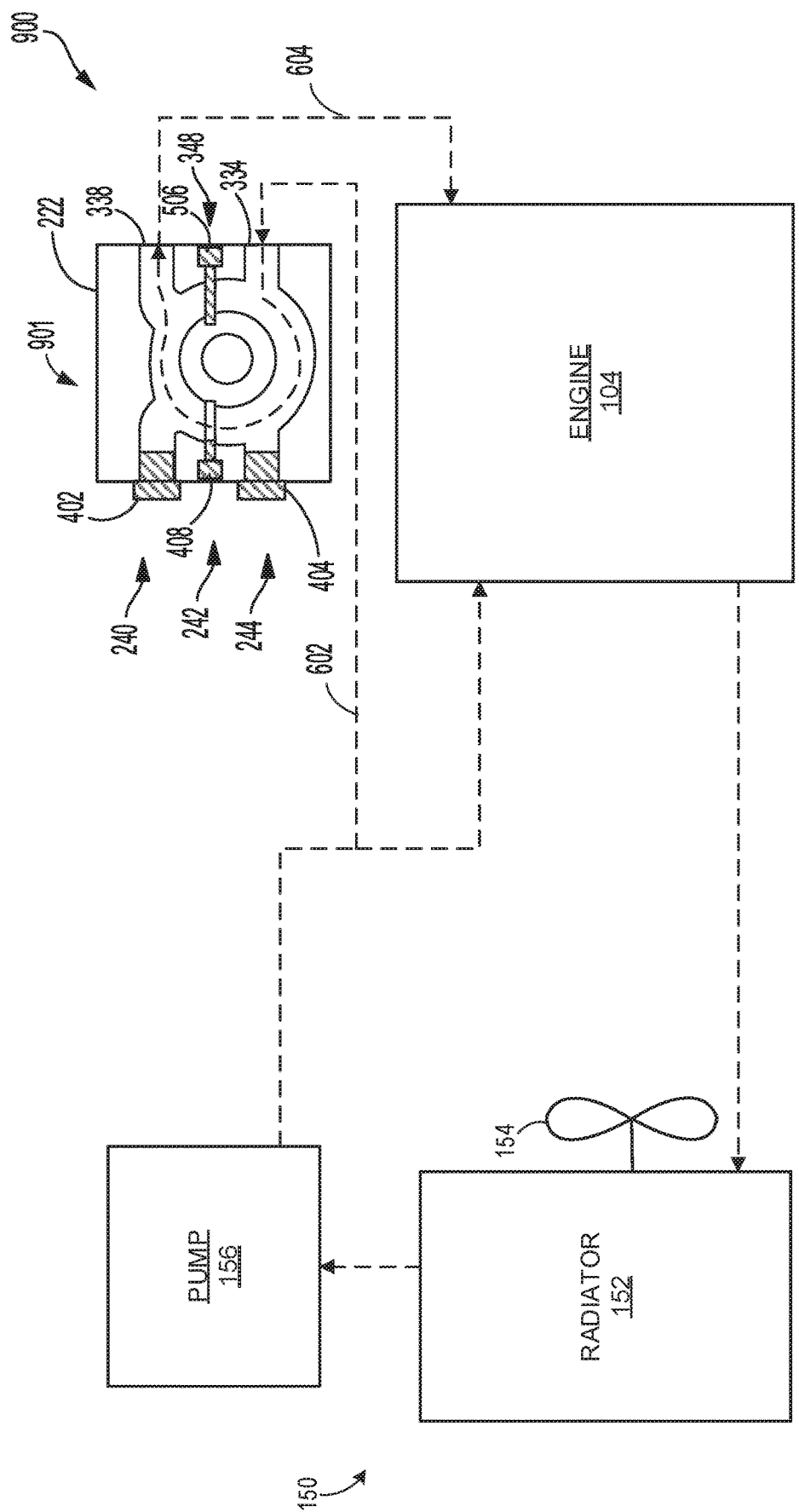
FIG. 9 shows a fourth example water line configuration for the center housing of FIG. 3.
Figure 10:
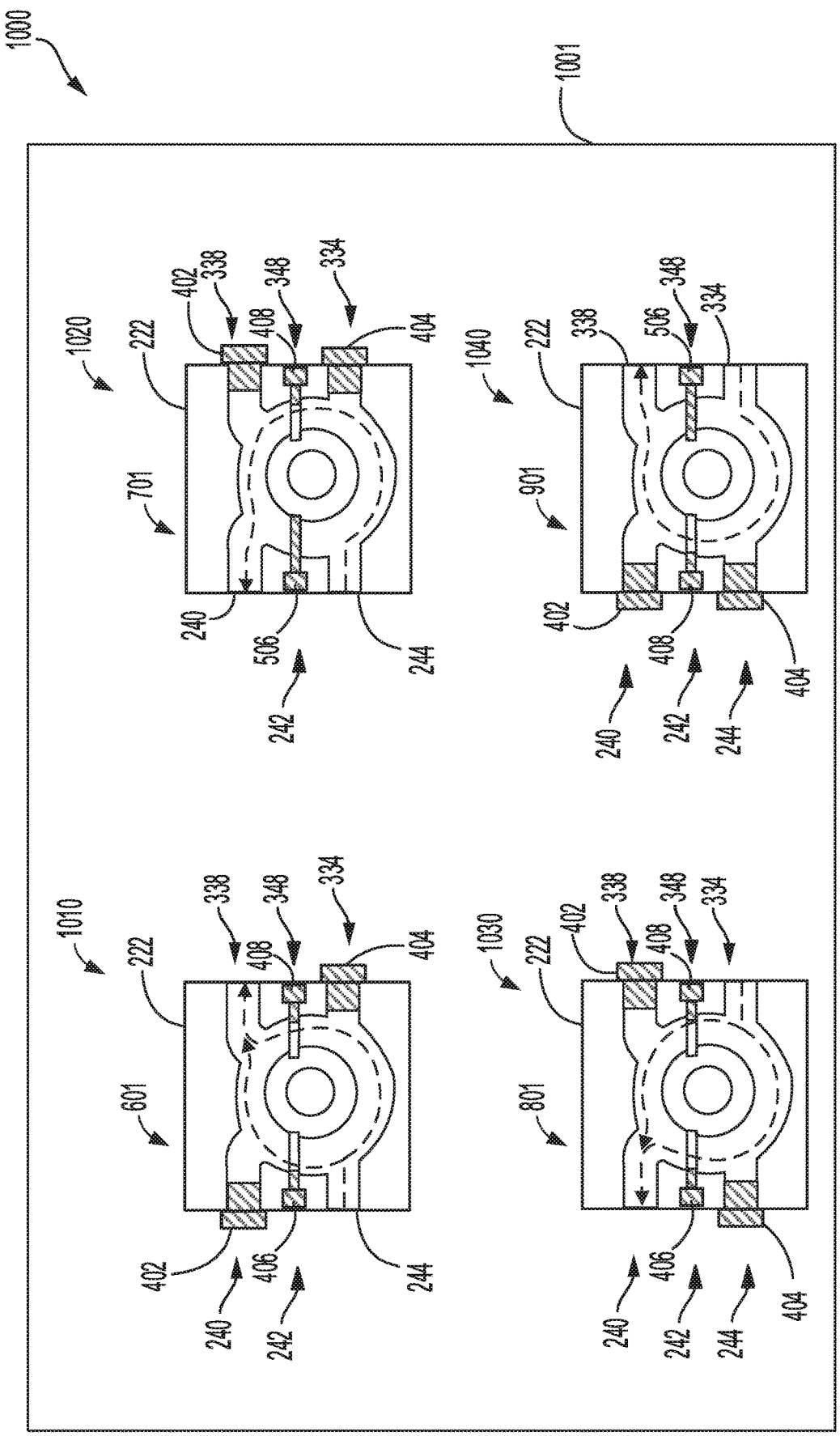
FIG. 10 shows a line of turbochargers including four turbochargers, each having a different center housing assembly configuration.

Turning now to FIG. 9, a block diagram 900 of an embodiment of a cooling system of an engine including a fourth center housing assembly configuration 901 is shown. Components of FIG. 9 previously introduced in FIGS. 1-8 are numbered the same and may not be reintroduced. The embodiment shown in block diagram 900 is identical to the cooling systems of block diagrams 600, 700, and 800 with the exception of the fourth center housing assembly configuration 901, as will be elaborated below.

Similar to the second center housing assembly configuration 701 of FIG. 7, the fourth center housing assembly configuration 901 includes the "circular flow" flow path configuration. However, unlike the second center housing assembly configuration 701, the fourth center housing assembly configuration 901 includes the second inlet water port 334 coupled to the entry water line 602 and the exit water line 604 coupled to the second outlet water port 338. The first water port plug 402 is positioned in the first outlet water port 240, and the second water port plug is positioned in the first inlet water port 244. Further, the fourth center housing assembly configuration 901 includes the long plug 506 positioned in routing port 348 (e.g., a plug that blocks flow through the water jacket) and the short plug 408 in routing port 242 (e.g., a plug that allows flow through the water jacket), such that cooling fluid flows from the entry water line 602 into the water jacket via the second inlet water port 334, through the water jacket in a clockwise (e.g., roughly circular) path around the central axis 226 shown in FIGS. 2 and 3, and out of the water jacket to the exit water line 604 via the second outlet water port 338. Thus, the entry water line 602 fluidically couples the pump 156 to the second inlet water port 334, and the exit water line 604 fluidically couples the second outlet water port 338 to the radiator 152.

Thus, FIGS. 6-9 show four distinct center housing assembly configurations that differ only in the selection and placement of various plugs. Two of the configurations shown (e.g., the configuration of FIG. 6 and the configuration of FIG. 8) include through flow, and a second two configurations (e.g., the configuration of FIG. 7 and the configuration of FIG. 9) include circular flow. By providing at least four possible configurations for the center housing assembly, the center housing may offer users more flexibility during installation, and may allow further modification after an initial installation.

FIG. 10 shows a schematic view 1000 of a turbocharger line 1001 (e.g., a line of turbochargers). The turbocharger line 1001 includes four turbochargers 1010, 1020, 1030, and 1040, view 1000 showing only the center housings of each turbocharger in the turbocharger line. Each of the four turbochargers may be identical with the exception of the configuration of each center housing. Each of the four turbochargers has a different center housing configuration, such that a different arrangement of water port plugs and routing plugs leads to a different flow path configuration through each turbocharger in the turbocharger line 1001. Components previously introduced in FIGS. 2-9 are numbered the same, function as previously described, and may not be reintroduced. Thus, each identical component included in each of the four center housing assemblies is labeled the same.

In the example turbocharger line 1001, each of the four center housing assemblies includes a distinct flow path configuration. Specifically, the turbocharger 1010 includes the first center housing assembly 601 introduced in FIG. 6, turbocharger 1020 includes the second center housing assembly 701 introduced in FIG. 7, turbocharger 1030 includes the third center housing assembly 801 introduced in FIG. 8, and turbocharger 1040 includes the fourth center housing assembly 901 in FIG. 9. Thus, turbochargers 1010 and 1030 each include flow path configurations that include cooling fluid entering the center housing 222 on one side and exiting the center housing 222 on the opposite side (e.g., the through-flow configuration). However, the first inlet water port 244 and the second outlet water port 338 are used as the water ports for cooling turbocharger 1010, and the opposite water ports (the second inlet water port 334 and the first outlet water port 240) are used as the water ports for cooling turbocharger 1030. Similarly, turbochargers 1020 and 1040 each include flow path configurations that include cooling fluid entering and exiting the center housing 222 on the same side (e.g., the circular flow configuration), although the first inlet water port 244 and the first outlet water port 240 are used as the water ports for cooling turbocharger 1020 while the second inlet water port 334 and the second outlet water port 338 are used as the water ports for cooling turbocharger 1040. Further, the long plug 506 is positioned in an opposite routing port in the second center housing configuration 701 of turbocharger 1020 (e.g., routing port 242) compared with the fourth center housing configuration 901 of turbocharger 1040 (e.g., routing port 348).

Figure 11:
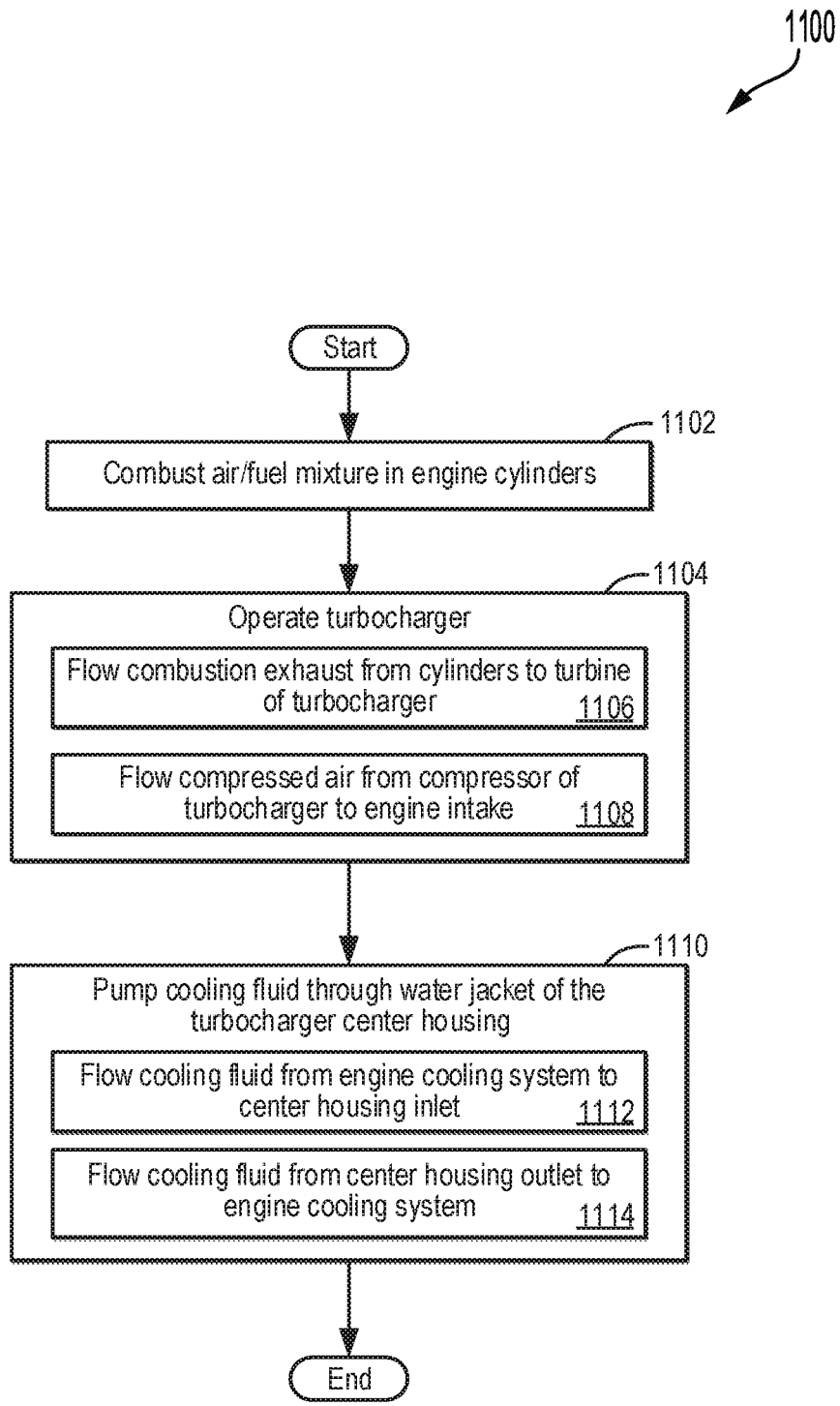
FIG. 11 shows an example method for flowing cooling fluid through a turbocharger center housing during engine system operation.

Next, FIG. 11 shows an example method 1100 for flowing coolant through a center housing of a turbocharger (e.g., center housing 222 described in FIGS. 2-10) during engine operation. For example, the turbocharger includes a turbine that may be driven by hot exhaust gases from the engine and operated to provide compressed intake air to the engine via a compressor rotationally coupled to the turbine. Thus, the center housing includes a water jacket that may be fluidically coupled to a cooling system of the engine in order to provide temperature relief. The center housing may be installed in any of the four example center housing assembly configurations provided in FIGS. 6-9. Instructions for carrying out method 1100 and the rest of the methods included herein may be executed by a controller (e.g., controller 110 shown in FIG. 1) based on instructions stored on a memory of the controller and in conjunction with signals received from sensors of the engine system, such as the sensors described above with reference to FIG. 1. The controller may employ engine actuators of the engine system (e.g., coolant pump 156 of FIG. 1) to adjust engine operation according to the methods described below.

At 1102, method 1100 includes combusting an air-fuel mixture in cylinders of the engine. For example, fuel from a fuel system may be delivered to the cylinders via fuel injectors (e.g., fuel injector 107 of FIG. 1), where the fuel is mixed with air, the amount of air controlled by adjusting an opening of an intake valve (e.g., intake valve 103 of FIG. 1). In one example, the amount of fuel to be delivered is empirically determined and stored in a predetermined lookup table or function, which may be indexed to engine operating conditions, such as engine speed and load, among other engine operating conditions (such as a desired air-fuel ratio). The controller may then determine a pulse-width of a control signal to send to the fuel injector actuator corresponding to the determined amount of fuel to be delivered. The resulting air-fuel mixture may be ignited (e.g., via spark plugs or compression ignition), generating power via expanding exhaust gases. After combustion, exhaust gases may be vented from the cylinder into an exhaust system.

At 1104, method 1100 includes operating the turbocharger. In one example, the turbocharger may be operated as a result of a boost request, an intake manifold pressure higher than ambient intake pressure is requested in order to meet a desired engine load. In another example, the turbocharger may be operated during all engine operating conditions. In yet another example, the turbocharger may be activated as a result of an exhaust gas temperature reaching a predetermined threshold (e.g., a light-off temperature of an emission control device), wherein the controller may adjust the position of a wastegate valve to route exhaust gases to, and not around, the turbocharger.

Operating the turbocharger includes flowing combustion exhaust from the cylinders to the turbine of the turbocharger, as indicated at 1106. For example, the turbocharger turbine maybe positioned in an exhaust stream of the engine such that all exhaust gases are directed to a turbine inlet (e.g., turbine inlet 228 of FIG. 2). In another example, a portion of exhaust gases may be directed to the turbine inlet, while another portion of exhaust gases may bypass the turbocharger. Further, in some examples the turbocharger may be a monoscroll turbocharger, such that a single inlet directs exhaust gases to the turbine. In other examples, the turbocharger may be a dual scroll turbocharger, such that more than one (e.g., two) inlets direct exhaust gases to the turbine. The expanding exhaust gases may cause the turbine to rotate, which drives the rotation of a turbocharger shaft coupled between the turbine and the compressor (e.g., turbocharger shaft 123 of FIG. 1), which in turn causes the compressor to rotate.

Operating the turbocharger further includes flowing compressed air from the compressor to an intake of the engine, as indicated at 1108. The rotation of the compressor compresses ambient air as it flows through the compressor inlet. The introduction of compressed air may increase a volumetric efficiency of the engine relative to operation without a turbocharger, for example.

At 1110, method 1100 includes pumping cooling fluid (e.g., water and/or antifreeze) through the water jacket of the center housing of the turbocharger. Pumping cooling fluid through the water jacket of the center housing includes flowing cooling fluid from the engine cooling system to an inlet of the center housing, as indicated at 1112, and flowing cooling fluid from an outlet of the center housing to the engine cooling system, as indicated at 1114. Thus, cooling fluid may be pumped from the engine cooling system to the turbocharger center housing via a water pump (e.g., pump 156 of FIG. 1) and water lines. The cooling fluid may enter the water jacket via one inlet water port selected from two possible inlet ports (e.g., the first inlet water port 244 or the second inlet water port 334 shown in FIGS. 3-10) of the center housing and may leave the water jacket via one outlet water port selected from two possible outlet ports (e.g., the first outlet water port 240 or the second outlet water port 338 shown in FIGS. 3-10). Further, the center housing may allow multiple installation configurations, such that a configuration of the water lines may be selected based on space constraints near the turbocharger. In one example, the center housing may be installed such that an entry water line is coupled to an inlet water port on one side face of the center housing, and an exit water line is coupled to an outlet port on a different side face of the center housing. In another example, the center housing may be installed such that the entry water line is coupled to an inlet port on one side face of the center housing, and the exit water line is coupled to an outlet port on the same side face. Each of the two unused water ports (e.g., one unused inlet water port and one unused outlet water port) may be sealed with a water port plug.

Further, the center housing assembly may be installed in one of the four configurations shown in FIGS. 6-9, each center housing assembly characterized by a distinct arrangement of water port plugs and routing plugs. Further, each center housing assembly may result in a distinct flow path configuration (e.g., path of cooling fluid through the water jacket of the center housing). In one example flow path configuration, the cooling fluid may flow into a water port on one side of the center housing, flow across the water jacket in two radial directions, and exit the water jacket on the opposite side of the center housing (e.g., through-flow). In a second example flow configuration, the cooling fluid may flow into a water port on one side of the center housing, flow around the water jacket in only one radial direction, and exit the water jacket on the same side of the center housing (e.g., circular flow). Method 1100 then ends. Although method 1100 provides a method for flowing coolant through the turbocharger center housing during engine operation, it may be understood that to reduce temperatures after engine shut-off, cooling fluid may continue to flow through the center housing water jacket after engine-off through a process known as thermal siphoning. During thermal siphoning, a temperature difference between the inlet and the outlet of the water jacket may pull warmer cooling fluid out of the water jacket outlet, which may in turn draw more cooling fluid through the water jacket inlet. This process of thermal siphoning facilitates turbocharger cooling after engine-off, without any active pumping of cooling fluid.

In this way, cooling fluid may be circulated through the center housing of a turbocharger during operation and after engine shutdown. Circulating cooling fluid through the center housing of a turbocharger decreases the temperature of one or more turbocharger components and may shield the turbocharger lubrication system from undesirable temperatures. Further, through the inclusion of a plurality of plugs, water ports, and routing ports, the center housing offers several different installation configurations, which may be selected by the user in order to fit an installation space. As a result, the center housing, a shaft traversing the center housing, and one or more bearings of the turbocharger may be maintained within an acceptable temperature range during turbocharger operation, which may reduce component degradation and/or oil coking.

The technical effect of including a center housing having two inlet port options, two outlet port options, and multiple flow routing configurations in a turbocharger is that turbocharger installation flexibility is increased.

An example provides for a center housing for a turbocharger, including an internal water jacket including at least two ports and a selectively pluggable interconnect positioned within the internal water jacket that, when plugged, blocks flow in the internal water jacket between the at least two ports in a first direction and, when unplugged, enables flow in the internal water jacket between the at least two ports in the first direction. In a first example of the center housing, the internal water jacket includes an annular passage that encircles a central axis of the center housing, and the first direction is a first radial direction. In a second example of the center housing, which optionally includes the first example, the selectively pluggable interconnect, when plugged, enables flow in the internal water jacket between the at least two ports in a second radial direction, opposite the first radial direction, and, when unplugged, enables flow in the internal water jacket between at least two ports in the first radial direction and the second radial direction. In a third example of the center housing, which optionally includes one or both of the first and second examples, the center housing further comprises a routing port that extends from an external surface of the center housing to the selectively pluggable interconnect, the routing port shaped to receive one of a shorter routing plug and a longer routing plug. In a fourth example of the center housing, which optionally includes one or more of each of the first through third examples, the selectively pluggable interconnect is unplugged with the shorter routing plug is installed in the routing port and plugged when the longer routing plug is installed in the routing port. In a fifth example of the center housing, which optionally includes one or more of each of the first through fourth examples, the longer routing plug fills an entirety of a cavity of the selectively pluggable interconnect when installed in the routing port, and the shorter routing plug does not fill the entirety of the cavity. In a sixth example of the center housing, which optionally includes one or more of each of the first through fifth examples, the at least two ports include an inlet port and an outlet port, the outlet port positioned vertically above the inlet port, a central axis of the inlet port parallel to a central axis of the outlet port. In a seventh example of the center housing, which optionally includes one or more of each of the first through sixth examples, the inlet port and the outlet port are positioned on a same side of the center housing. In an eighth example of the center housing, which optionally includes one or more of each of the first through seventh examples the inlet port and the outlet port are positioned on opposite sides of the center housing.

Another example provides for a kit for a turbocharger comprising: a center housing including an internal water jacket, the internal water jacket including a plurality of water ports that each extend to an external surface of the center housing, the center housing further including a first routing port extending from the external surface to a first selectively pluggable interconnect within the internal water jacket and a second routing port extending from the external surface to a second selectively pluggable interconnect within the internal water jacket, a plurality of water port plugs, each of the plurality of water port plugs configured to be interchangeably inserted into any port of the plurality of water ports, and a plurality of routing plugs configured to be interchangeably inserted into either of the first routing port and the second routing port, the plurality of routing plugs including at least one longer plug and at least one shorter plug. In a first example of the kit for the turbocharger, the at least one longer plug, when inserted into the first routing port, blocks flow through the first routing port and blocks flow through the first selectively pluggable interconnect and, when inserted into the second routing port, blocks flow through the second routing port and blocks flow through the second selectively pluggable interconnect. In a second example of the kit for the turbocharger, which optionally includes the first example, the at least one shorter plug, when inserted into the first routing port, blocks flow through the first routing port without blocking flow through the first selectively pluggable interconnect and, when inserted into the second routing port, blocks flow through the second routing port without blocking flow through the second selectively pluggable interconnect. In a third example of the kit for the turbocharger, which optionally includes one or both of the first and second examples, the plurality of water ports comprises a first inlet water port, a second inlet water port, a first outlet water port, and a second outlet water port, the first inlet water port vertically aligned with the second inlet water port and positioned vertically below the first outlet water port, the second outlet water port vertically aligned with the first outlet water port and positioned vertically above the second inlet water port. In a fourth example of the kit for the turbocharger, which optionally includes one or more of each of the first through third examples, the plurality of water port plugs includes two water port plugs and the plurality of routing plugs includes two shorter plugs and one longer plug. In a fifth example of the kit for the turbocharger, which optionally includes one or more of each of the first through fourth examples, the first routing port is positioned vertically between the first inlet water port and the first outlet water port, and the second routing port is positioned vertically between the second inlet water port and the second outlet water port.

A further example provides for a center housing for a turbocharger comprising: an internal water jacket including an annular passage that encircles a central axis, the annular passage divided between a first portion and a second portion via a first interconnect and a second interconnect, a first routing port extending between an exterior surface of the center housing and the first interconnect, and a second routing port extending between the exterior surface and the second interconnect. In a first example of the center housing, the center housing further comprises a first inlet water port and a first outlet water port that each extend between the annular passage and the exterior surface on a first side, a second inlet water port and a second outlet water port that each extend between the annular passage and the exterior surface on a second side, a first water port sealing plug positioned in one of the first inlet water port and the second inlet water port, a second water port sealing plug positioned in one of the first outlet water port and the second outlet water port, a first routing plug positioned in the first routing port, and a second routing plug positioned in the second routing port. In a second example of the center housing, which optionally includes the first example, the first water port sealing plug is positioned in the first inlet water port, the second water port sealing plug is positioned in the first outlet water port, the first routing plug is a short plug that seals the first routing port without sealing the first interconnect, and the second routing plug is a long plug that seals the second routing port and seals the second interconnect. In a third example of the center housing, which optionally includes one or both of the first and second examples, the first water port sealing plug is positioned in the first inlet water port, the second water port sealing plug is positioned in the second outlet water port, the first routing plug is a short plug that seals the first routing port without sealing the first interconnect, and the second routing plug is a short plug that seals the second routing port without sealing the second interconnect. In a fourth example of the center housing, which optionally includes one or more of the first through third examples, the first inlet water port and the second inlet water port are connected to the first portion of the annular passage, the first outlet water port and the second outlet water port are connected to the second portion of the annular passage, the first routing port is positioned vertically between the first inlet water port and the first outlet water port, and the second routing port is positioned vertically between the second inlet water port and the second outlet water port.

In another representation, a line of turbochargers comprises a first turbocharger including a first center housing configured to be fluidically coupled to a coolant entry line and a coolant exit line a same side of the first center housing; and a second turbocharger including a second center housing configured to be fluidically coupled to the coolant entry line and the coolant exit line on opposite sides of the second center housing. In the preceding example, additionally or optionally, each of the first center housing and the second center housing includes a first inlet water port and a first outlet water port positioned on a first side face and a second inlet water port and a second outlet water port positioned on a second side face, each of the first inlet water port, the first outlet water port, the second inlet water port, and the second outlet water port extending from an exterior surface to an internal water jacket. In one or both of the preceding examples, additionally or optionally, the first side face and the second side face are opposite each other across a width of the center housing. In any or all of the preceding examples, additionally or optionally, each of the first center housing and the second center housing includes a first routing port positioned vertically between the first inlet port and the first outlet port on the first side face and a second routing port positioned vertically between the second inlet port and the second outlet port on the second side face. In any or all of the preceding examples, additionally or optionally, for each of the first center housing and the second center housing, the first routing port extends from the exterior surface to a first constrictive area within the internal water jacket, and the second routing port extends from the exterior surface to a second constrictive area within the internal water jacket. In any or all of the preceding examples, additionally or optionally, the first center housing is configured to be fluidically coupled to the coolant entry line at the first inlet port and is configured to be fluidically coupled to the coolant exit line at the first outlet port. In any or all of the preceding examples, additionally or optionally, the first center housing includes a first water port plug sealing the second inlet water port, a second water port plug sealing the second outlet water port, a long routing plug sealing the first routing port and the first constrictive area, and a short routing plug sealing the second routing port and not the second constrictive area. In any or all of the preceding examples, additionally or optionally, the first center housing is configured to be fluidically coupled to the coolant entry line at the second inlet port and is configured to be fluidically coupled to the coolant exit line at the second outlet port. In any or all of the preceding examples, additionally or optionally, the first center housing includes a first water port plug sealing the first inlet water port, a second water port plug sealing the first outlet water port, a long routing plug sealing the second routing port and the second constrictive area, and a short routing plug sealing the first routing port and not the first constrictive area. In any or all of the preceding examples, additionally or optionally, the second center housing is configured to be fluidically coupled to the coolant entry line at the first inlet port and is configured to be fluidically coupled to the coolant exit line at the second outlet port. In any or all of the preceding examples, additionally or optionally, the second center housing includes a first water port plug sealing the second inlet water port, a second water port plug sealing the first outlet water port, a first short routing plug sealing the first routing port and not the first constrictive area, and a short routing plug sealing the second routing port and not the second constrictive area. In any or all of the preceding examples, additionally or optionally, the second center housing is configured to be fluidically coupled to the coolant entry line at the second inlet port and is configured to be fluidically coupled to the coolant exit line at the first outlet port. In any or all of the preceding examples, additionally or optionally, the second center housing includes a first water port plug sealing the first inlet water port, a second water port plug sealing the second outlet water port, a first short routing plug sealing the first routing port and not the first constrictive area, and a short routing plug sealing the second routing port and not the second constrictive area.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A center housing for a turbocharger, comprising:
an internal water jacket including at least two ports; and
a selectively pluggable interconnect positioned within the internal water jacket that, when plugged, blocks flow in the internal water jacket between the at least two ports in a first direction and, when unplugged, enables flow in the internal water jacket between the at least two ports in the first direction.

2. The center housing of claim 1, wherein the internal water jacket includes an annular passage that encircles a central axis of the center housing, and the first direction is a first radial direction.

3. The center housing of claim 2, wherein the selectively pluggable interconnect, when plugged, enables flow in the internal water jacket between the at least two ports in a second radial direction, opposite the first radial direction, and, when unplugged, enables flow in the internal water jacket between at least two ports in the first radial direction and the second radial direction.

4. The center housing of claim 1, further comprising a routing port that extends from an external surface of the center housing to the selectively pluggable interconnect, the routing port shaped to receive one of a shorter routing plug and a longer routing plug.

5. The center housing of claim 4, wherein the selectively pluggable interconnect is unplugged with the shorter routing plug is installed in the routing port and plugged when the longer routing plug is installed in the routing port.

6. The center housing of claim 4, wherein the longer routing plug fills an entirety of a cavity of the selectively pluggable interconnect when installed in the routing port, and the shorter routing plug does not fill the entirety of the cavity.

7. The center housing of claim 1, wherein the at least two ports include an inlet port and an outlet port, the outlet port positioned vertically above the inlet port, a central axis of the inlet port parallel to a central axis of the outlet port.

8. The center housing of claim 7, wherein the inlet port and the outlet port are positioned on a same side of the center housing.

9. The center housing of claim 7, wherein the inlet port and the outlet port are positioned on opposite sides of the center housing.

10. A kit for a turbocharger, comprising:
a center housing including an internal water jacket, the internal water jacket including a plurality of water ports that each extend to an external surface of the center housing, the center housing further including a first routing port extending from the external surface to a first selectively pluggable interconnect within the internal water jacket and a second routing port extending from the external surface to a second selectively pluggable interconnect within the internal water jacket;
a plurality of water port plugs, each of the plurality of water port plugs configured to be interchangeably inserted into any port of the plurality of water ports; and
a plurality of routing plugs configured to be interchangeably inserted into either of the first routing port and the second routing port, the plurality of routing plugs including at least one longer plug and at least one shorter plug.

11. The kit of claim 10, wherein the at least one longer plug, when inserted into the first routing port, blocks flow through the first routing port and blocks flow through the first selectively pluggable interconnect and, when inserted into the second routing port, blocks flow through the second routing port and blocks flow through the second selectively pluggable interconnect.

12. The kit of claim 10, wherein the at least one shorter plug, when inserted into the first routing port, blocks flow through the first routing port without blocking flow through the first selectively pluggable interconnect and, when inserted into the second routing port, blocks flow through the second routing port without blocking flow through the second selectively pluggable interconnect.

13. The kit of claim 10, wherein the plurality of water ports comprises a first inlet water port, a second inlet water port, a first outlet water port, and a second outlet water port, the first inlet water port vertically aligned with the second inlet water port and positioned vertically below the first outlet water port, the second outlet water port vertically aligned with the first outlet water port and positioned vertically above the second inlet water port.

14. The kit of claim 13, wherein the plurality of water port plugs includes two water port plugs and the plurality of routing plugs includes two shorter plugs and one longer plug.

15. The kit of claim 13, wherein the first routing port is positioned vertically between the first inlet water port and the first outlet water port, and the second routing port is positioned vertically between the second inlet water port and the second outlet water port.

16. A center housing for a turbocharger, comprising:
an internal water jacket including an annular passage that encircles a central axis, the annular passage divided between a first portion and a second portion via a first interconnect and a second interconnect;
a first routing port extending between an exterior surface of the center housing and the first interconnect; and
a second routing port extending between the exterior surface and the second interconnect.

17. The center housing of claim 16, further comprising:
a first inlet water port and a first outlet water port that each extend between the annular passage and the exterior surface on a first side;
a second inlet water port and a second outlet water port that each extend between the annular passage and the exterior surface on a second side;
a first water port sealing plug positioned in one of the first inlet water port and the second inlet water port;
a second water port sealing plug positioned in one of the first outlet water port and the second outlet water port;
a first routing plug positioned in the first routing port; and a second routing plug positioned in the second routing port.

18. The center housing of claim 17, wherein the first water port sealing plug is positioned in the first inlet water port, the second water port sealing plug is positioned in the first outlet water port, the first routing plug is a short plug that seals the first routing port without sealing the first interconnect, and the second routing plug is a long plug that seals the second routing port and seals the second interconnect.

19. The center housing of claim 17, wherein the first water port sealing plug is positioned in the first inlet water port, the second water port sealing plug is positioned in the second outlet water port, the first routing plug is a short plug that seals the first routing port without sealing the first interconnect, and the second routing plug is a short plug that seals the second routing port without sealing the second interconnect.

20. The center housing of claim 17, wherein the first inlet water port and the second inlet water port are connected to the first portion of the annular passage, the first outlet water port and the second outlet water port are connected to the second portion of the annular passage, the first routing port is positioned vertically between the first inlet water port and the first outlet water port, and the second routing port is positioned vertically between the second inlet water port and the second outlet water port.

\* \* \* \* \*